(12) United States Patent
Rosen et al.

(10) Patent No.: US 7,264,885 B2
(45) Date of Patent: Sep. 4, 2007

(54) ENHANCEMENT OF THE WETTING OF HYDROPHOBIC SURFACES BY AQUEOUS SURFACTANT SOLUTIONS

(75) Inventors: Milton J. Rosen, Great Neck, NY (US); Yong Fu Wu, Anhui (CN)

(73) Assignee: Research Foundation of the City University of New York, New York, NY (US)

( * ) Notice: Subject to any disclaimer, the term of this patent is extended or adjusted under 35 U.S.C. 154(b) by 0 days.

(21) Appl. No.: 10/385,298

(22) Filed: Mar. 10, 2003

(65) Prior Publication Data

US 2004/0030024 A1    Feb. 12, 2004

Related U.S. Application Data

(63) Continuation-in-part of application No. 10/318,321, filed on Dec. 12, 2002, now abandoned, which is a continuation-in-part of application No. 10/213,927, filed on Aug. 7, 2002, now abandoned.

(51) Int. Cl.
*B32B 33/00* (2006.01)

(52) U.S. Cl. .................. 428/523; 428/411.1; 428/409; 428/426

(58) Field of Classification Search ................ 428/523, 428/411.1, 409, 426; 568/573; 548/579
See application file for complete search history.

(56) References Cited

U.S. PATENT DOCUMENTS

| | | | |
|---|---|---|---|
| 5,558,806 A | | 9/1996 | Policello et al. |
| 5,837,043 A | * | 11/1998 | Wong et al. ............. 106/31.58 |
| 5,928,416 A | * | 7/1999 | Gundlach et al. ........ 106/31.58 |
| 6,100,227 A | * | 8/2000 | Burlew ....................... 510/245 |
| 6,503,978 B1 | * | 1/2003 | Tsao et al. .................. 524/556 |
| 6,610,129 B1 | * | 8/2003 | Sader et al. ............. 106/31.27 |
| 7,115,547 B2 | * | 10/2006 | Madachik, Jr. ............. 507/261 |
| 2002/0014611 A1 | | 2/2002 | Taylor et al. |
| 2006/0128589 A1 | * | 6/2006 | Shriner ....................... 510/407 |

OTHER PUBLICATIONS

Kemi Alcohol (C6-C18) ethoxylates (2002), http://www.kemi.se/kemamne_eng/alkohol(C6-18)etoxilater_eng.htm.*
D. S. Murphy, G. J. Murphy, and G. Policello, "The Influence Of Cosurfactants On The Physical Properties Of Organosilicone Adjuvants: Part II—Acetylenic Diol Based Surfactants," *Proc. North Central Weed Science Society* (1992) 47: 66-67.
G. J. Murphy, D. S. Murphy, and G. Policello, "Effective Cosurfactants For Use With Organosilicone Adjuvants," *Proc. Southern Weed Science Society* (1993) 46: 328.
C. D. Bain, "Sum-Frequency Vibrational Spectroscopy Of The Solid/Liquid Interface," *J. Chem. Soc. Faraday Trans.*, (1995) 91(9):1281-1296.
G. R. Bell, C. D. Bain, Z. X. Li, R. K. Thomas, D. C. Duffy, J. Penfold, "Structure Of A Monolayer Of Hexadecyltrimethylammonium P-Tosylate At The Air-Water Interface,", *J. Am. Chem. Soc.*, (1997) 119: 10227-10228.
B. D. Casson, R. Braun, C. D. Bain, "Phase Transitions In Monolayers Of Medium-Chain Alcohols On Water Studied By Sum-Frequency Spectroscopy And Ellipsometry," *Faraday Discuss.*, (1996) 104: 209-229.
G. R. Bell, C. D. Bain, R. N. Ward, "Sum-Frequency Vibrational Spectroscopy Of Soluble Surfactants At The Air/Water Interface," *J. Chem. Soc. Faraday Trans.*, (1996) 92(4): 515-523.
S. Manning-Benson, C. D. Bain, R. C. Darton, "Measurement Of Dynamic Interfacial Properties In An Overflowing Cylinder By Ellipsometry," *Journal of Colloid and Interface Science*, (1997) 189: 109-116.
M. S. Hook, P. G. Hartley, P. J. Thistlethwaite, "Fabrication And Characterization Of Spherical Zirconia Particles For Direct Force Measurements Using The Atomic Force Microscope," *Langmuir*, (1999) 15: 6220-6225.
P. J. Thistlethwaite, M. S. Hook, "Diffuse Reflectance Fourier Transform Infrared Study Of The Adsorption Of Oleate/Oleic Acid Onto Titania," *Langmuir*, (2000) 16: 4993-4998.
R. Fraenkel, G. E. Butterworth, C. D. Bain, "In Situ Vibrational Spectroscopy Of An Organic Monolayer At The Sapphire-Quartz Interface," *J. Am. Chem. Soc.*, (1998) 120: 203-204.
B. D. Casson, C. D. Bain, "Unequivocal Evidence For A Liquid-Gas Phase Transition In Monolayers Of Decanol Adsorbed At The Air/Water Interface," *J. Am. Chem. Soc.*, (1999) 121: 2615-2616.

* cited by examiner

*Primary Examiner*—D. Lawrence Tarazano
(74) *Attorney, Agent, or Firm*—Hoffmann & Baron, LLP; Irving N. Feit

(57) ABSTRACT

A solid hydrophobic surface wetted with an aqueous solution that includes a first and second surfactant. The first surfactant includes a first straight-chain, branched chain or cyclic hydrocarbon chain and a first hydrophilic moiety. The second surfactant includes a second straight-chain, branched chain or cyclic hydrocarbon chain and a second hydrophilic moiety. The first and second straight-chain, branched chain or cyclic hydrocarbon chains may or may not be the same; the first and second hydrophilic moieties are not the same; and the first surfactant is added to the second surfactant in an amount that causes a synergistic increase in the spreading factor on the hydrophobic surface.

10 Claims, 28 Drawing Sheets

Figure 1:
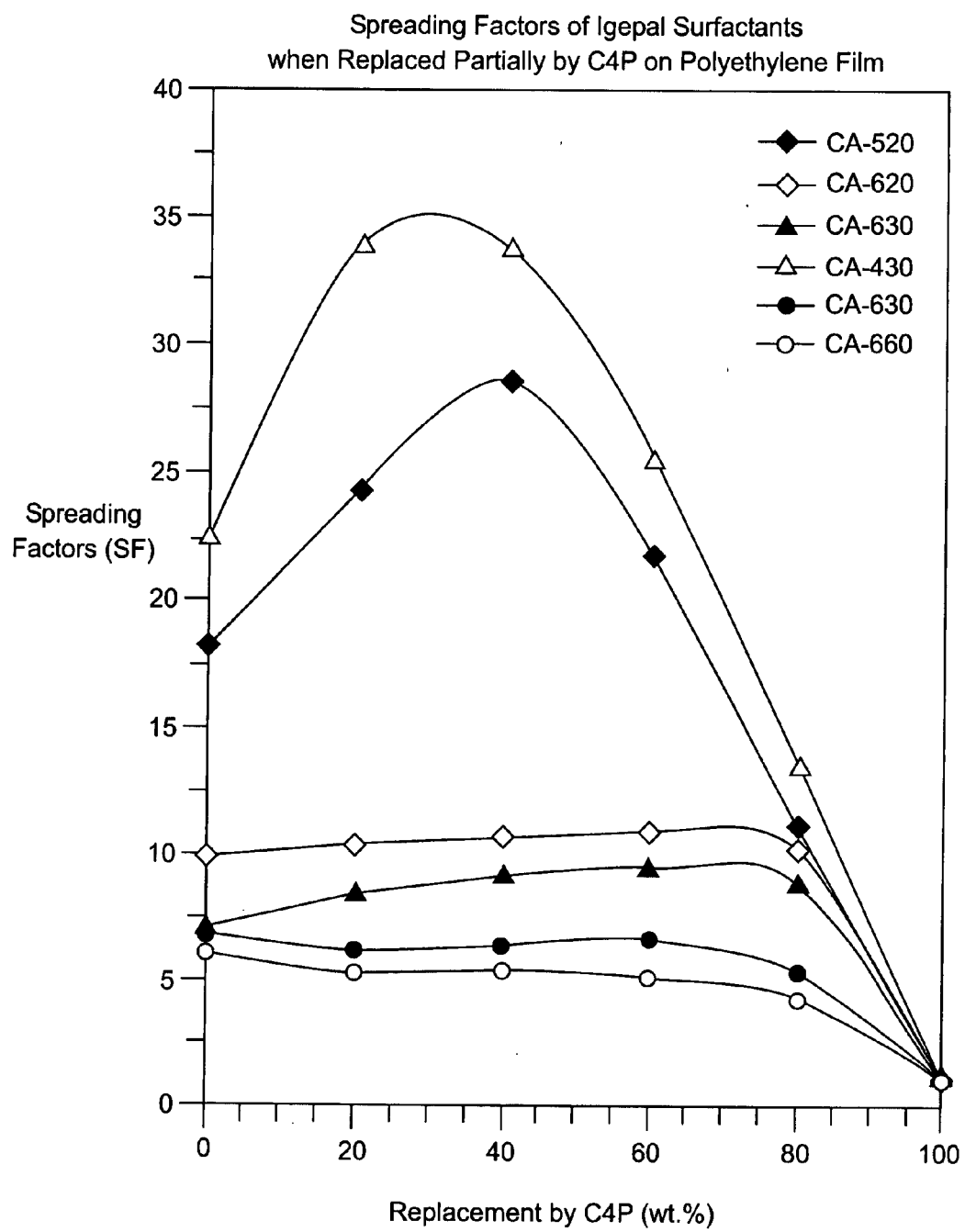
Figure 2:
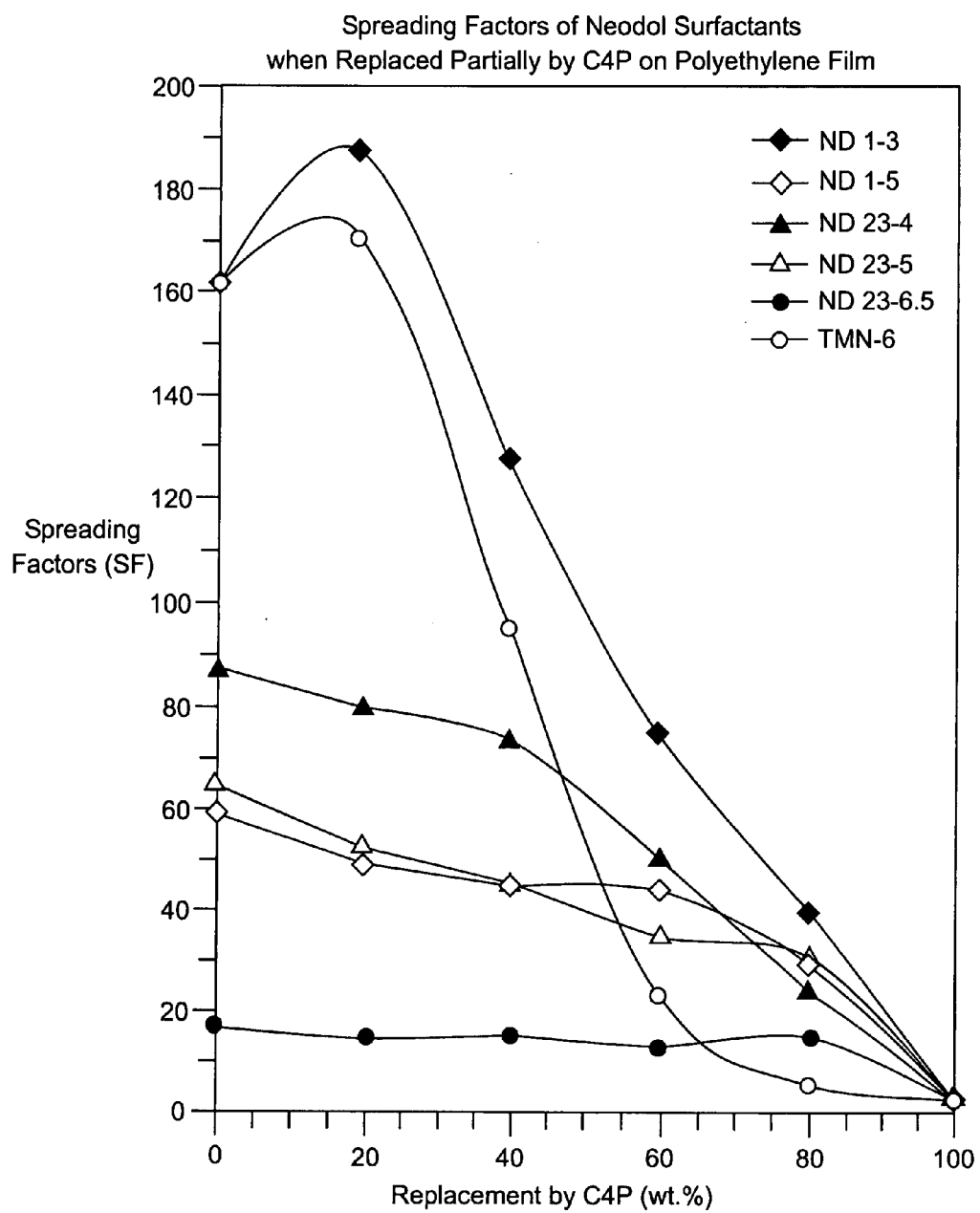
Figure 3:
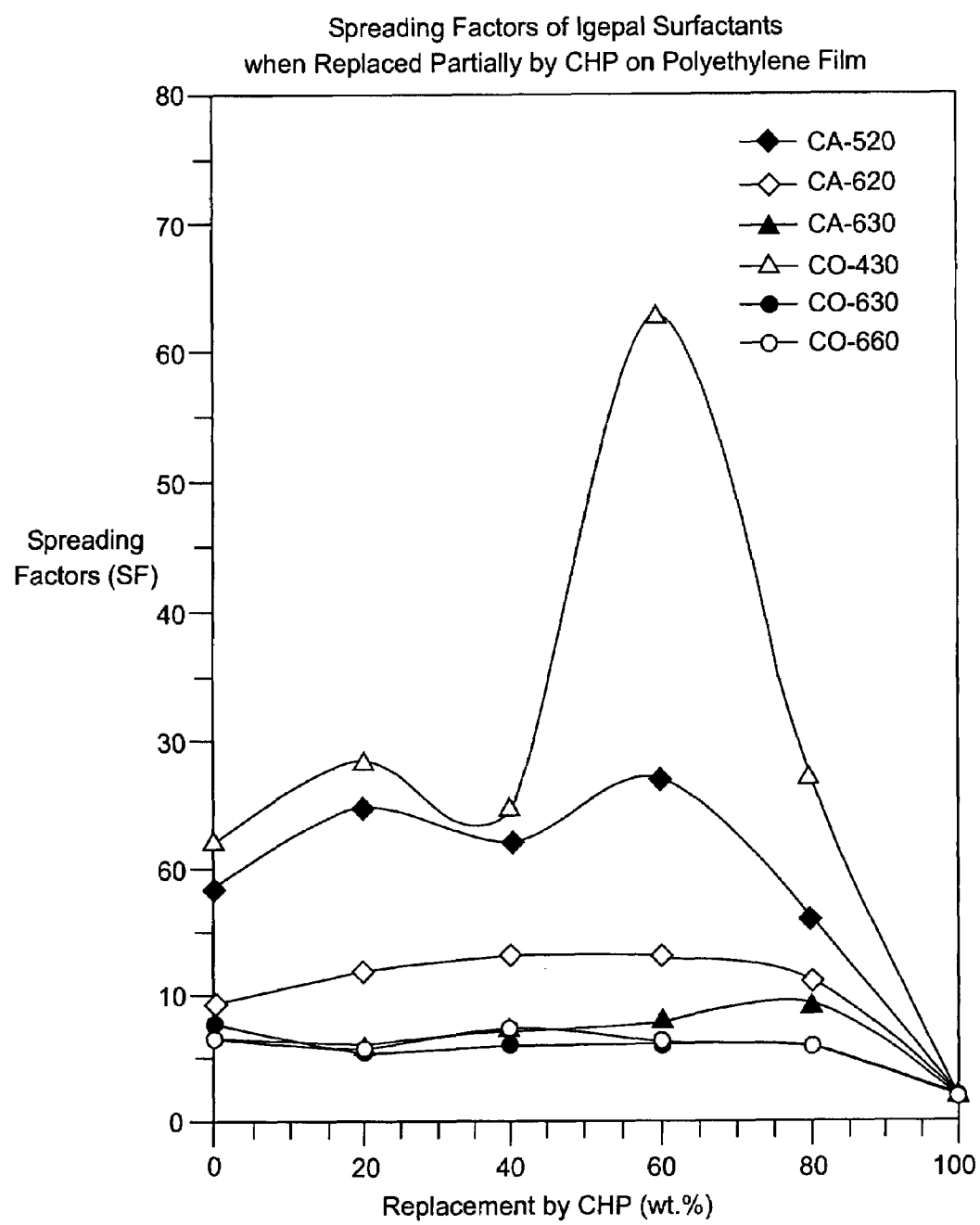
Figure 4:
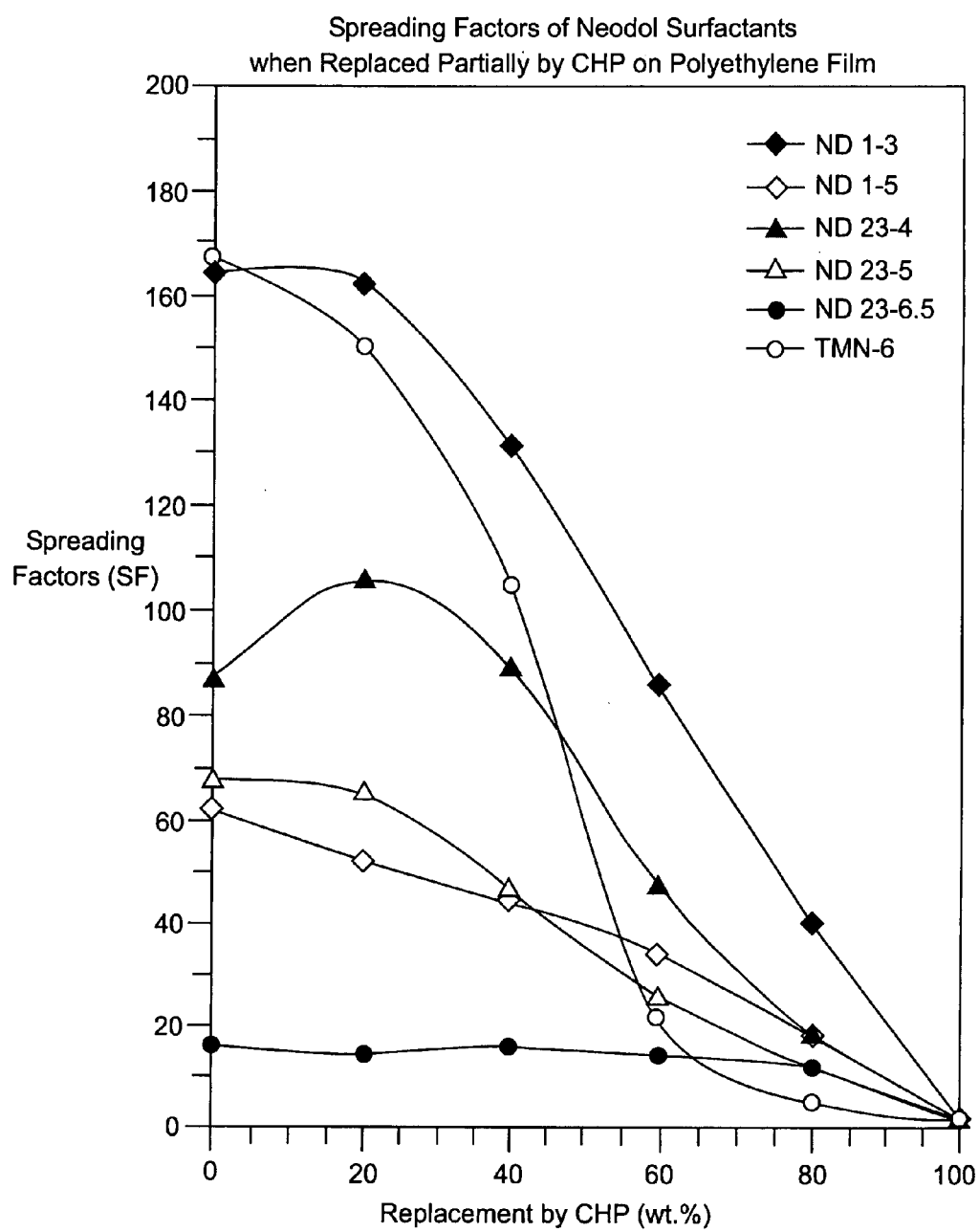
Figure 5:
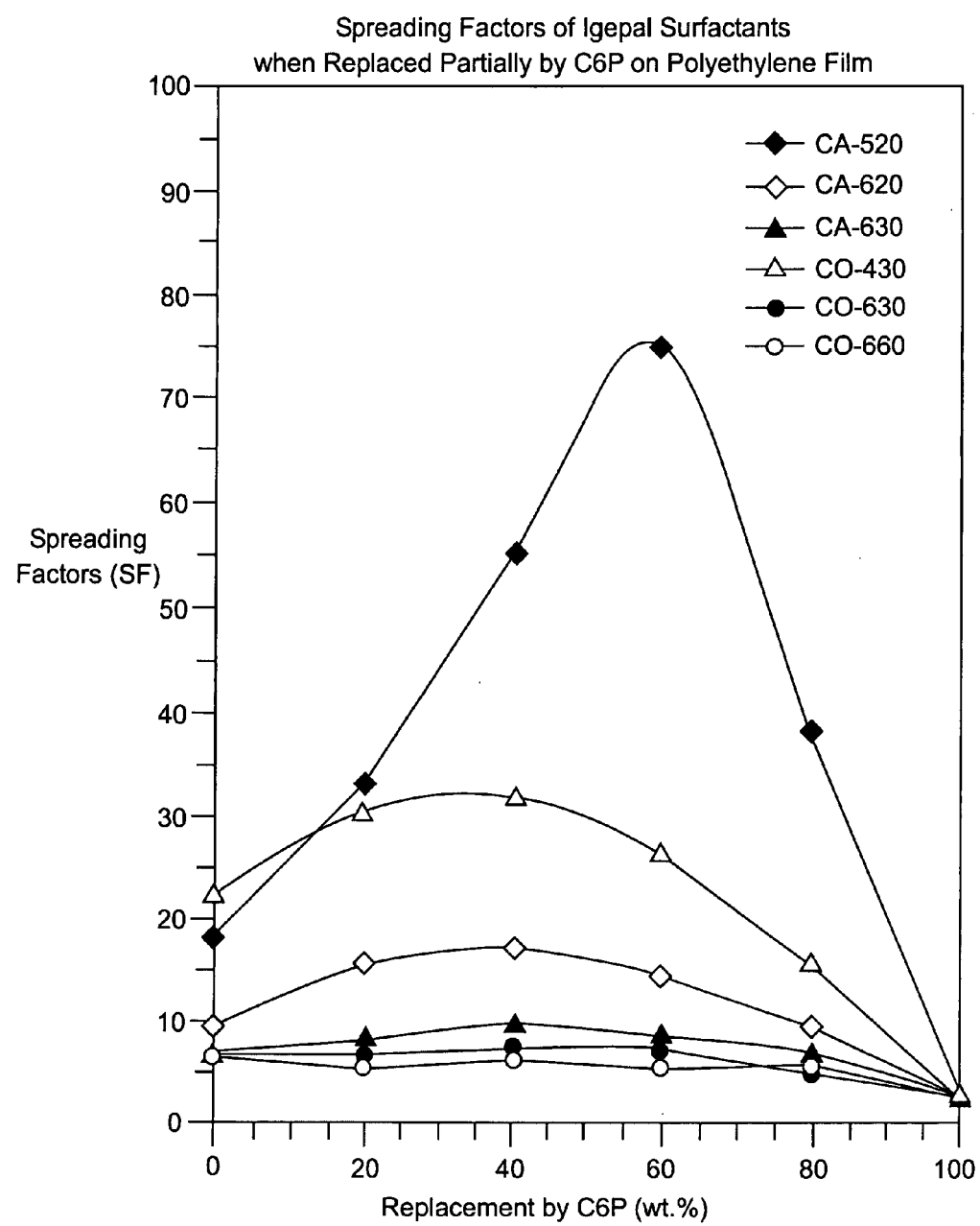
Figure 6:
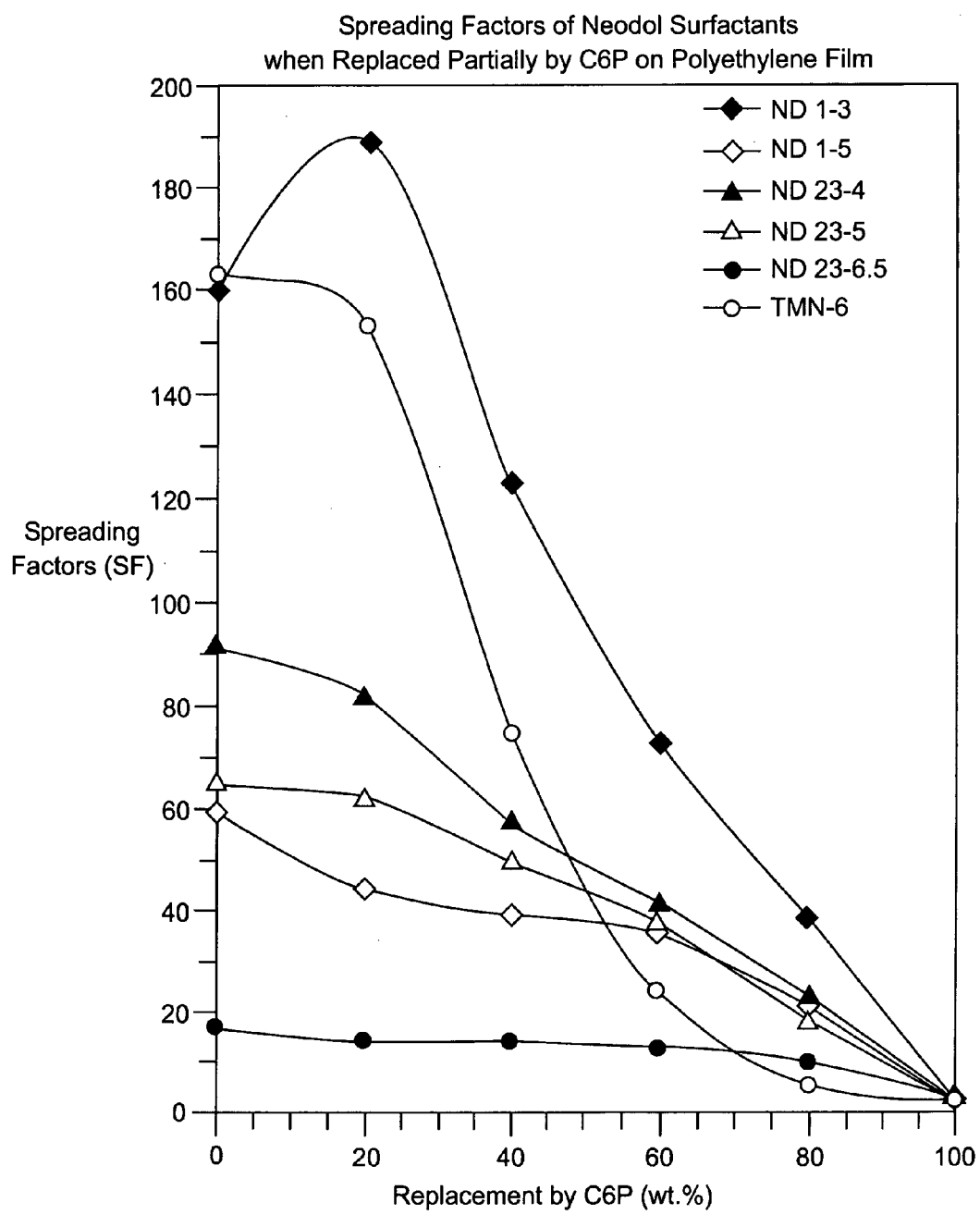
Figure 7:
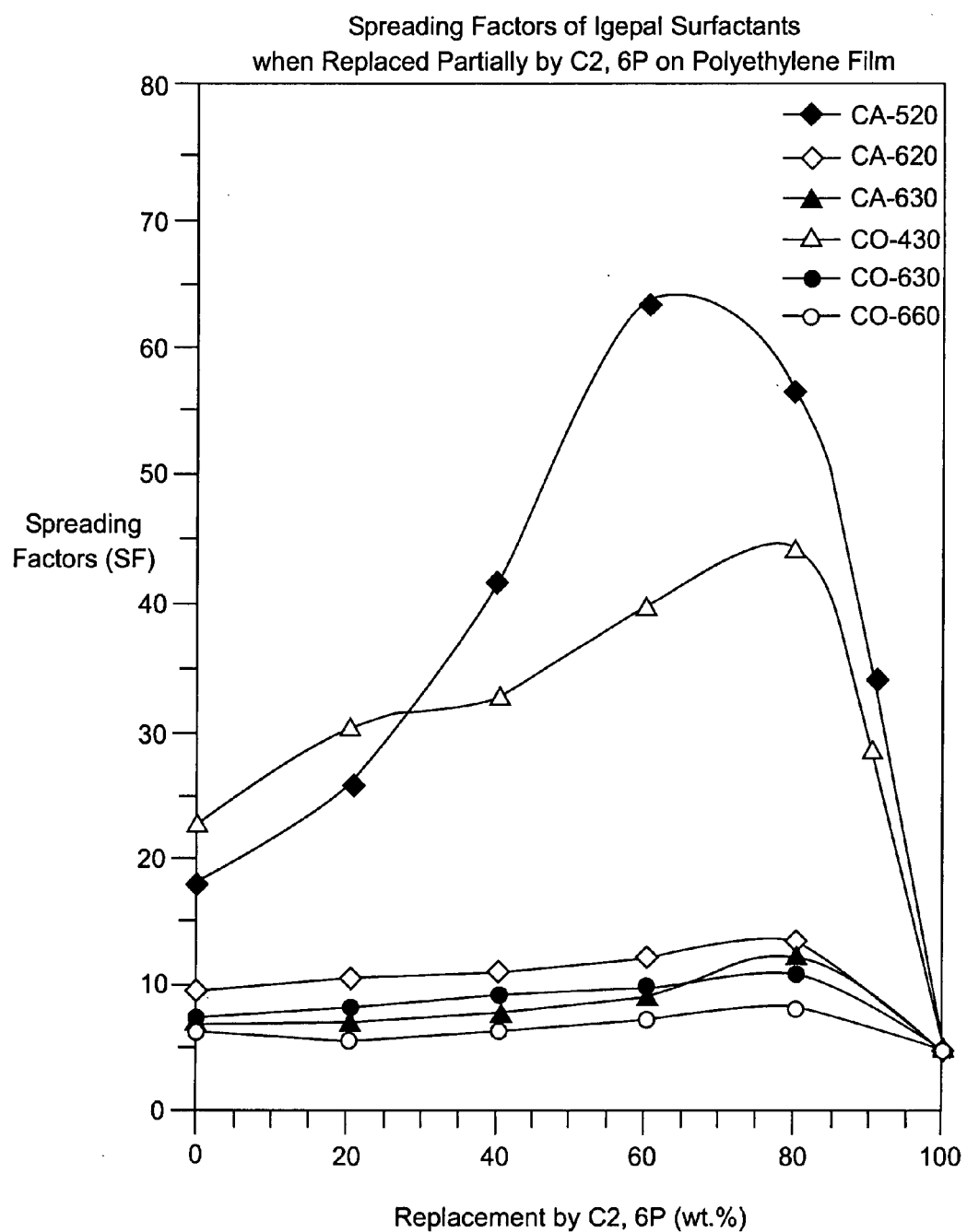
Figure 8:
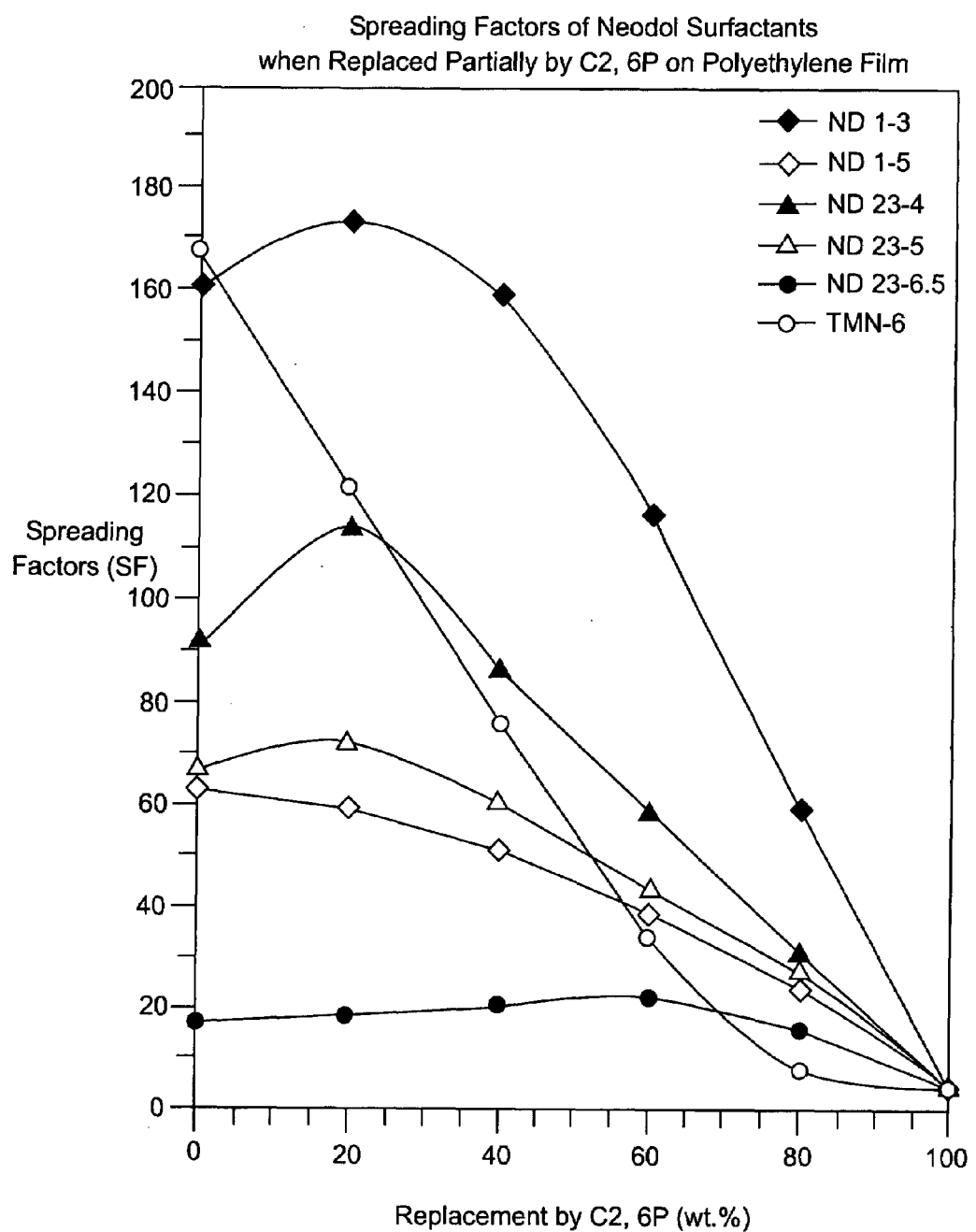
Figure 9:
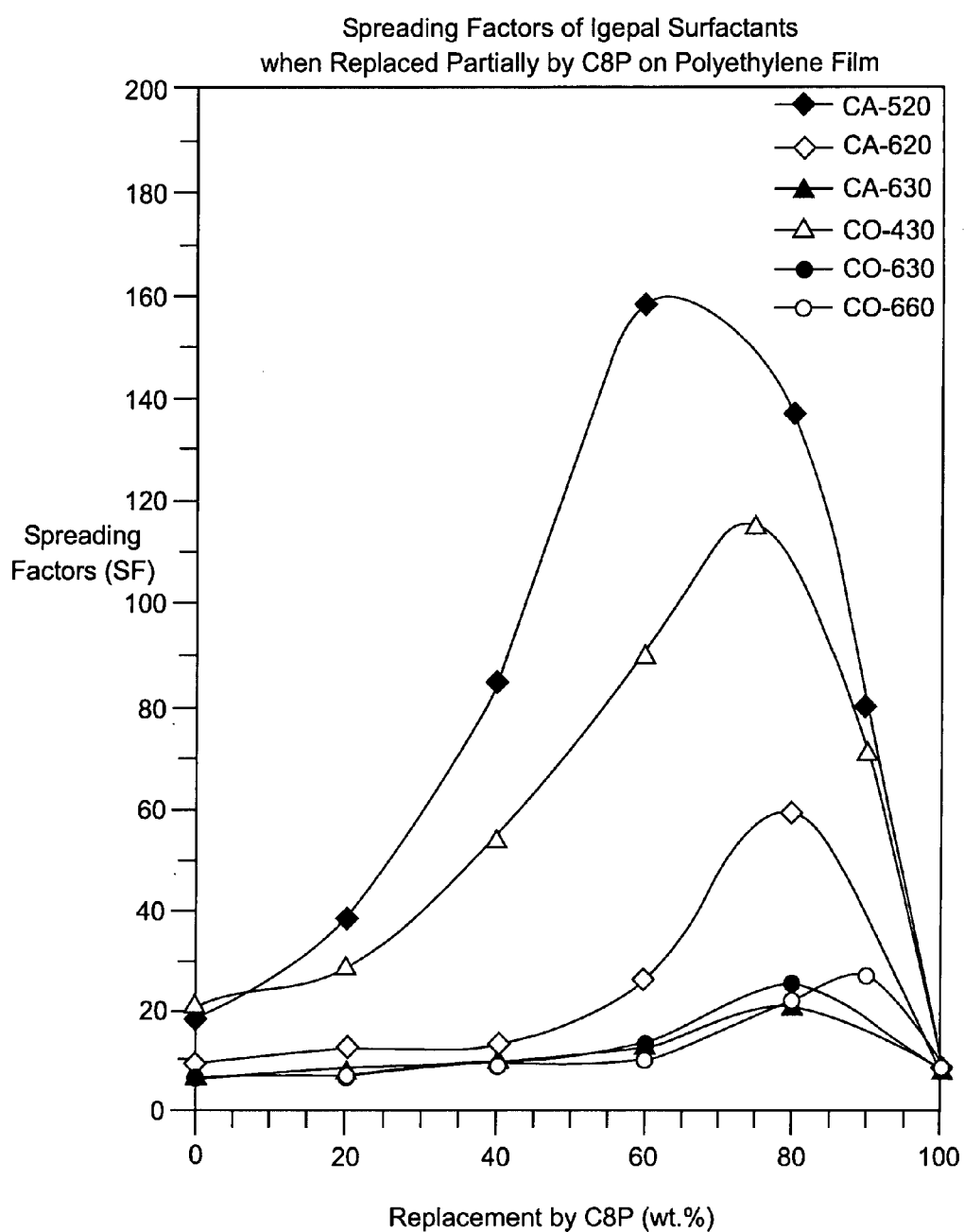
Figure 10:
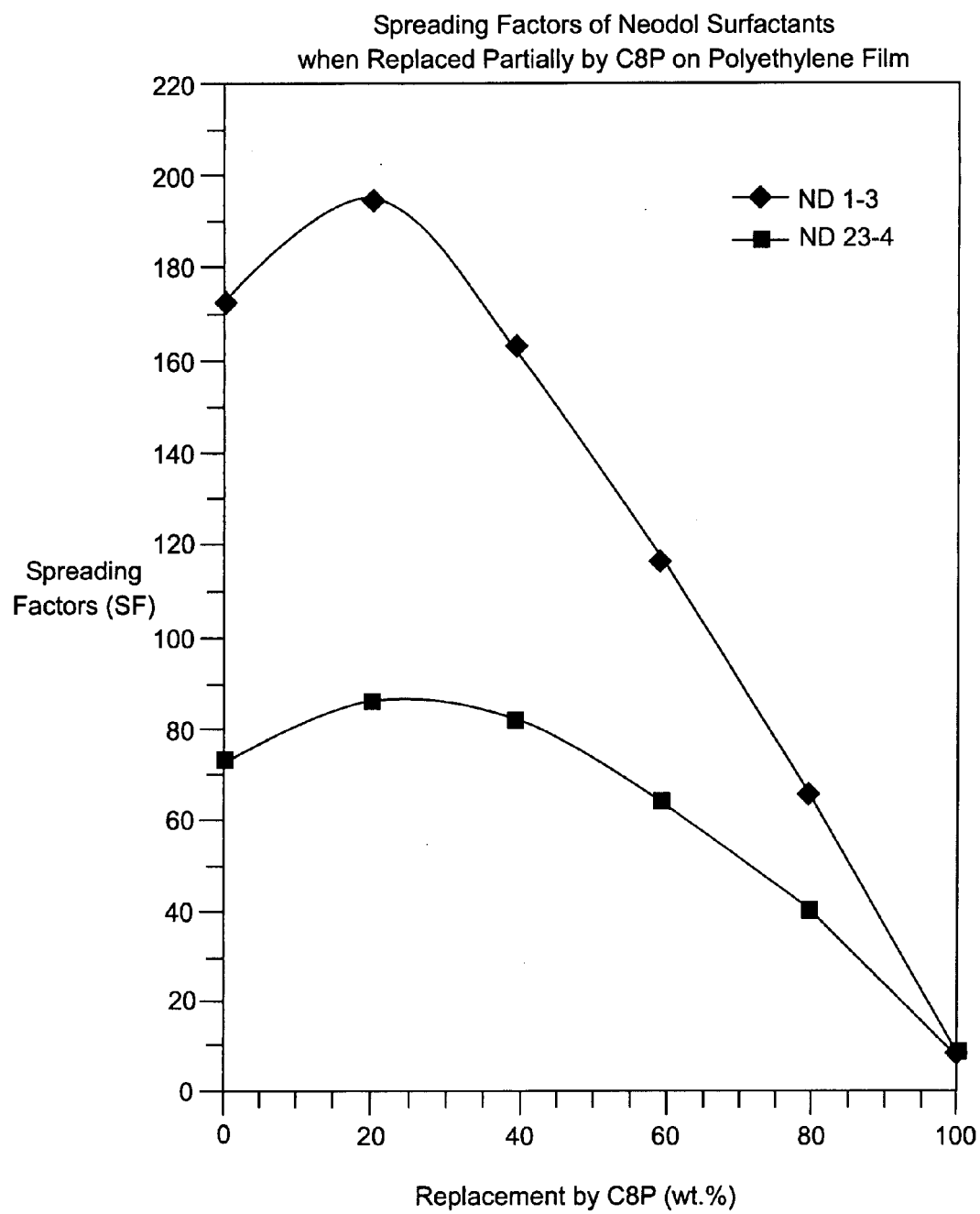
Figure 11:
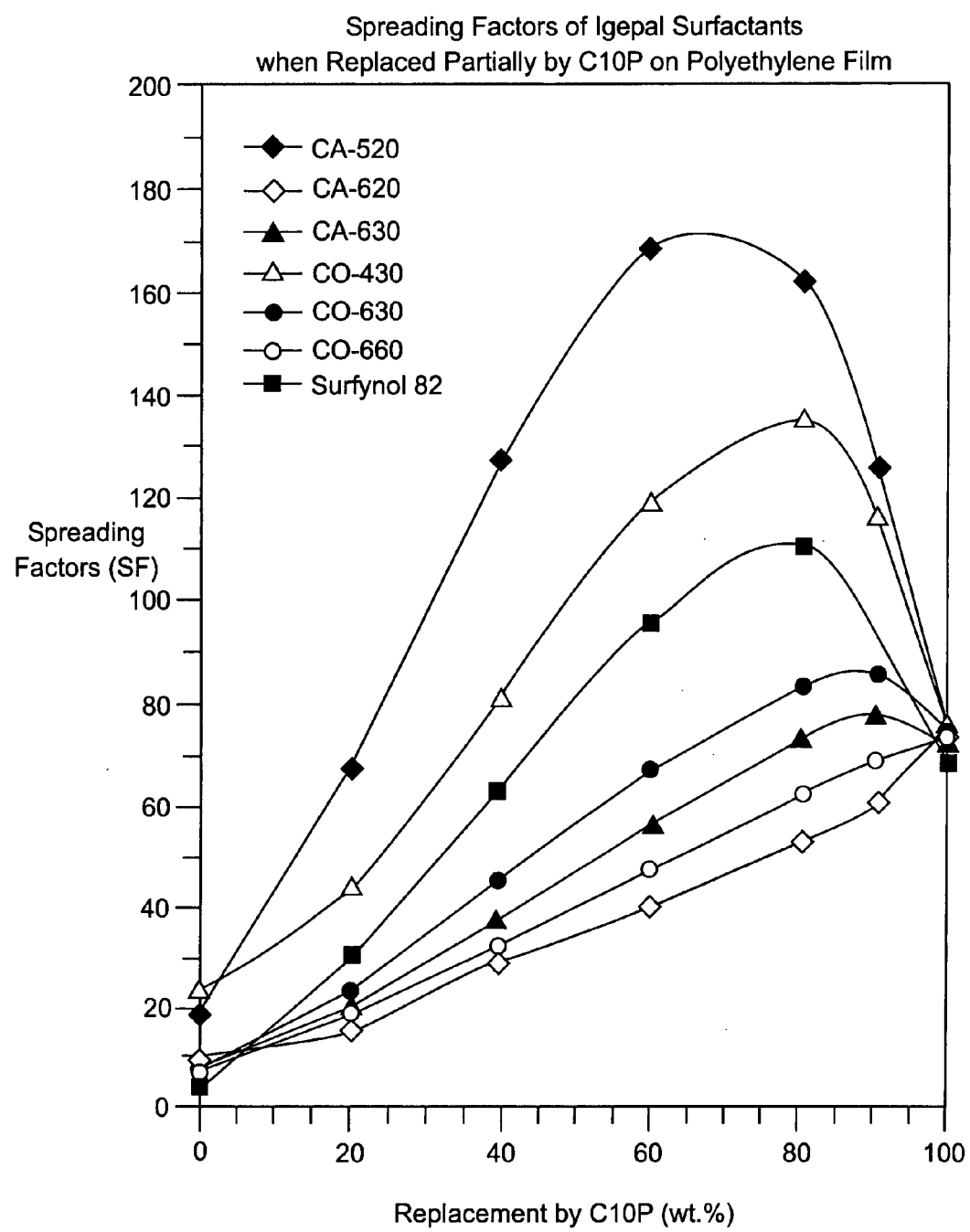
Figure 12:
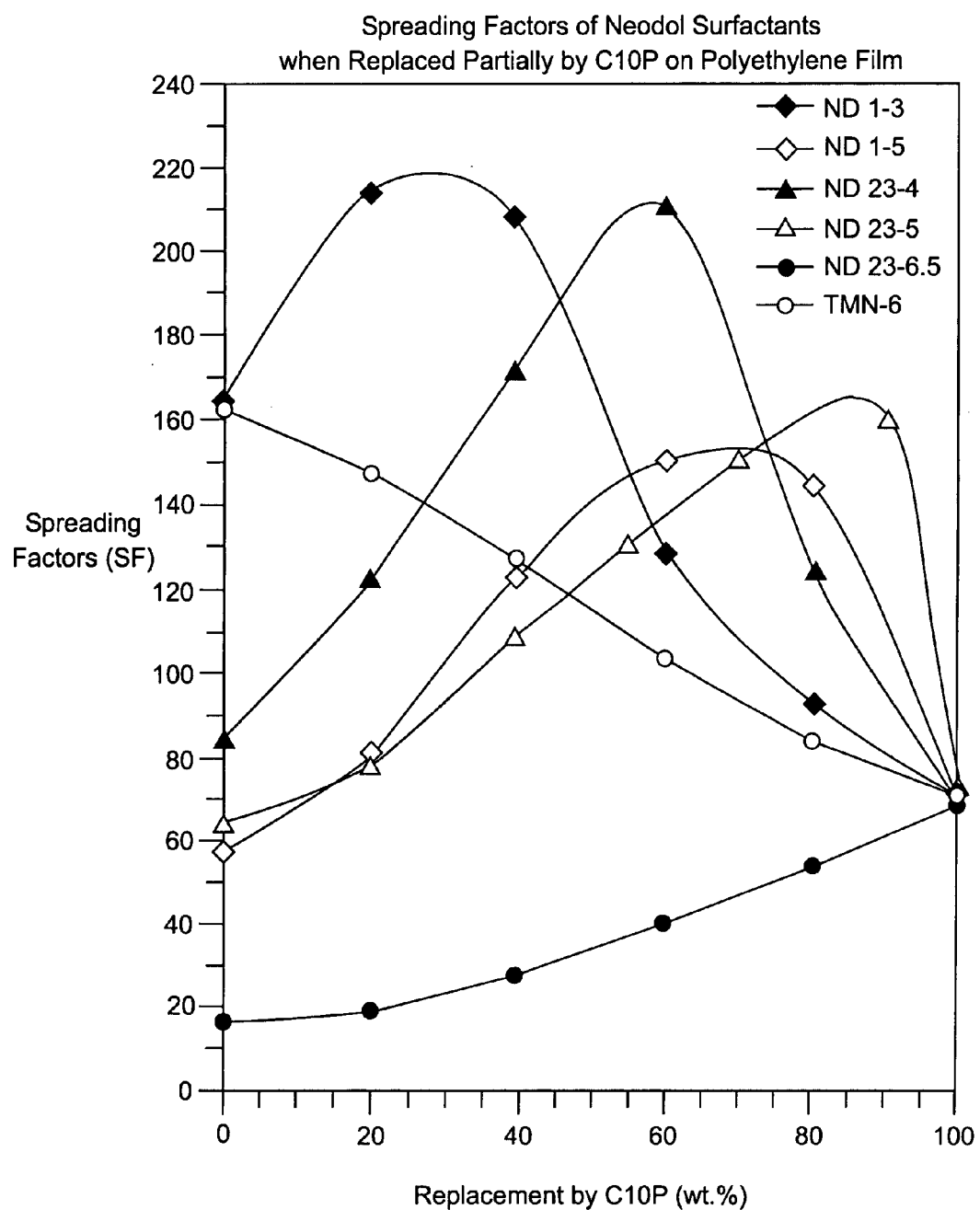
Figure 13:
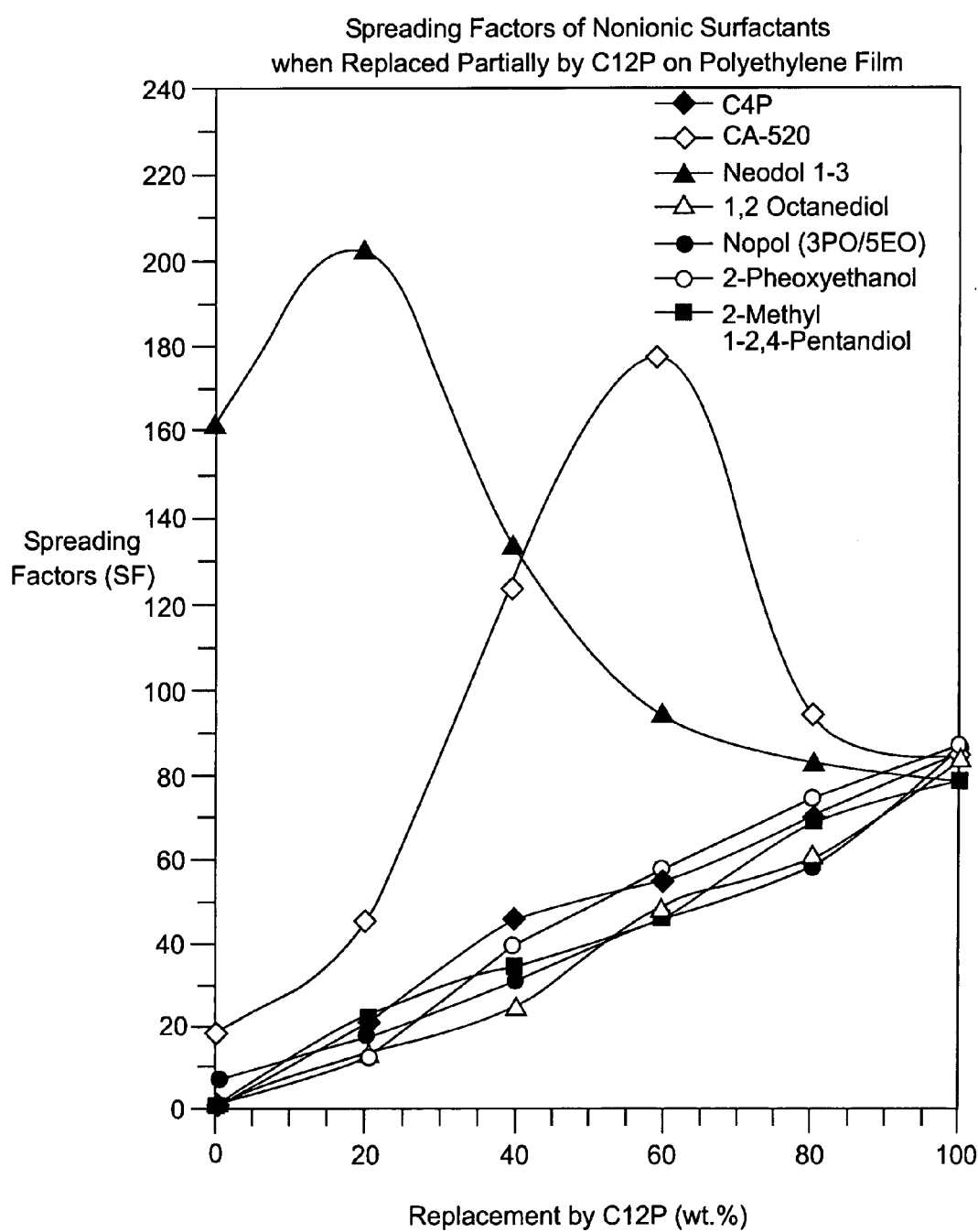
Figure 14:
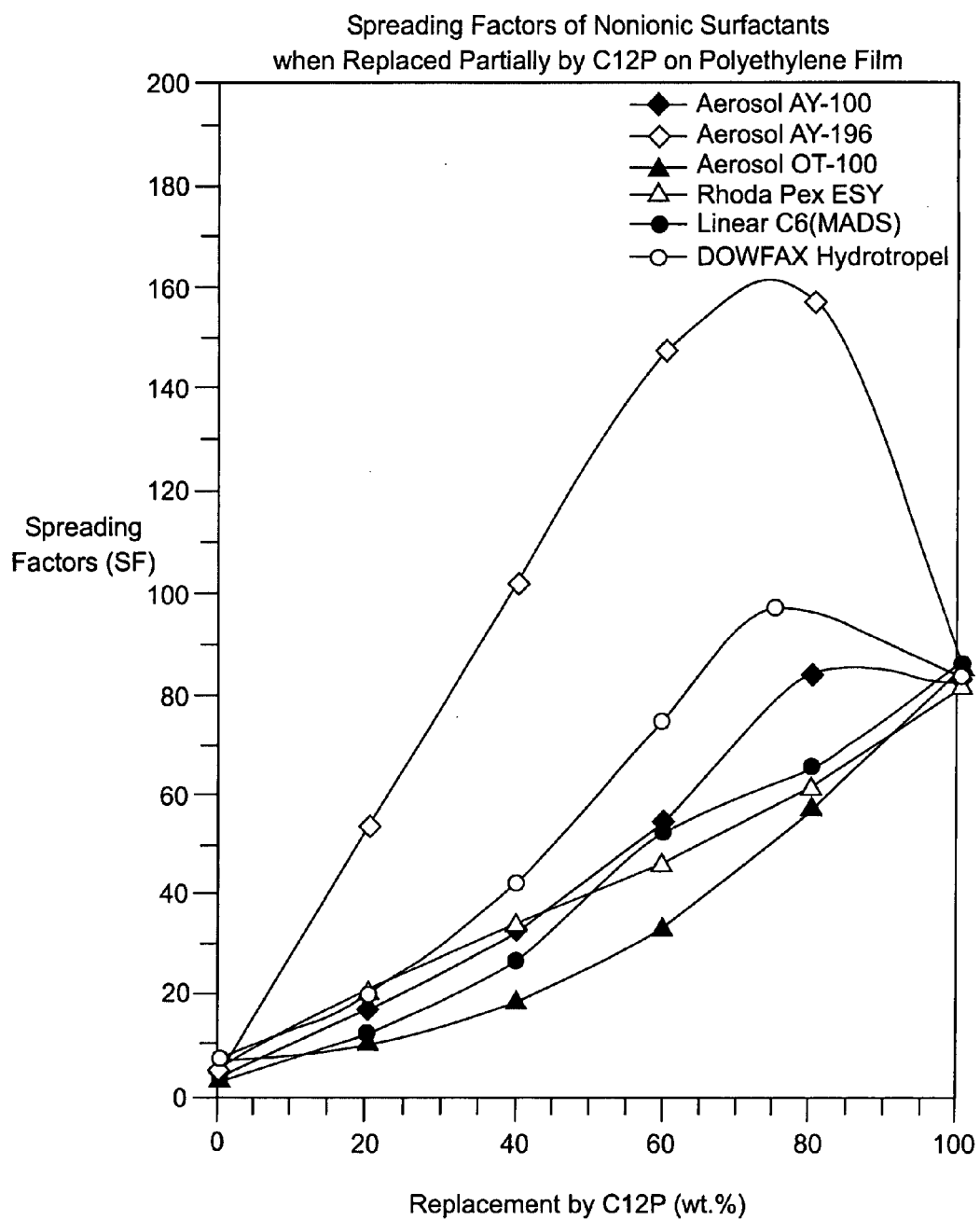
Figure 15:
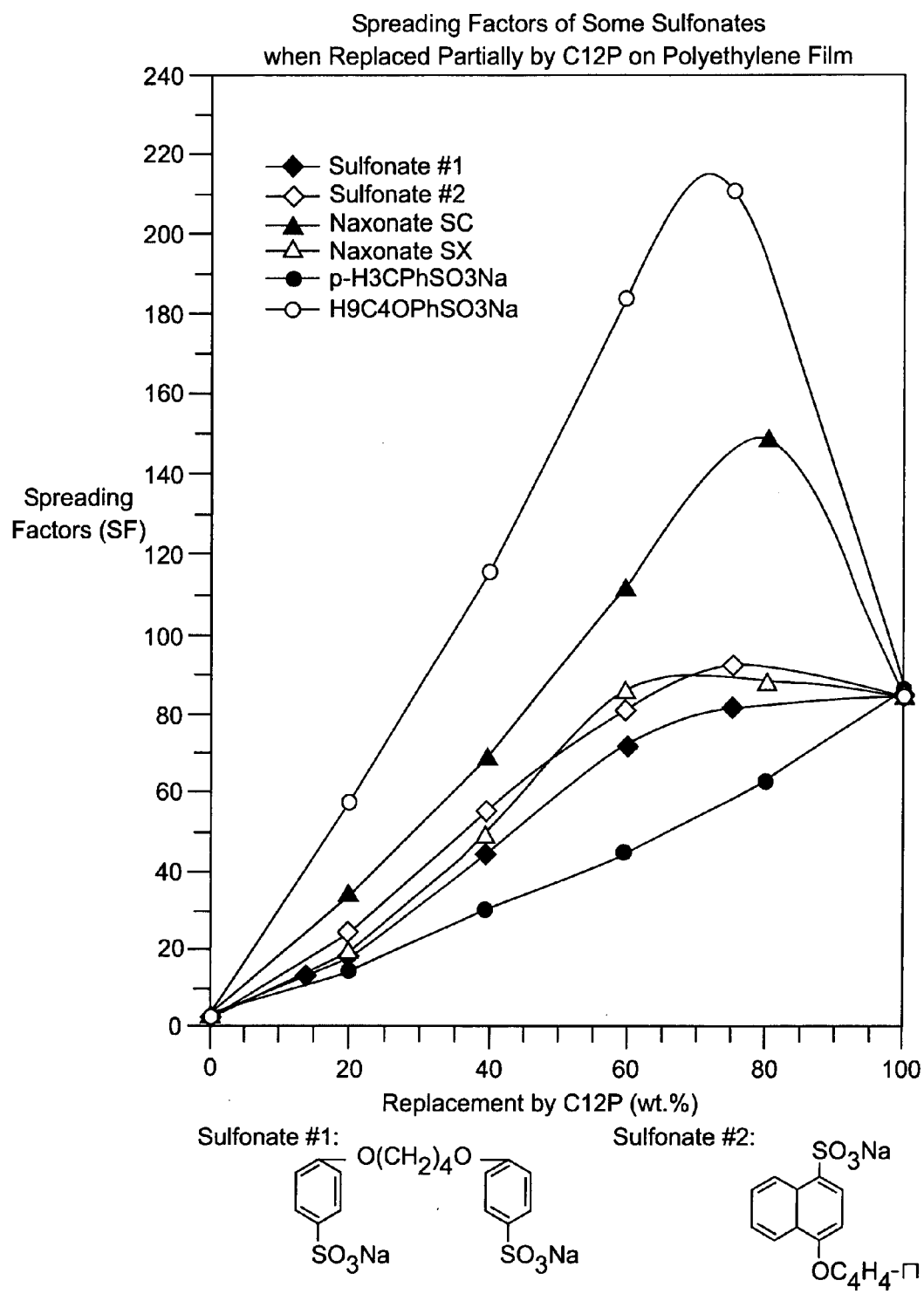
Figure 16:
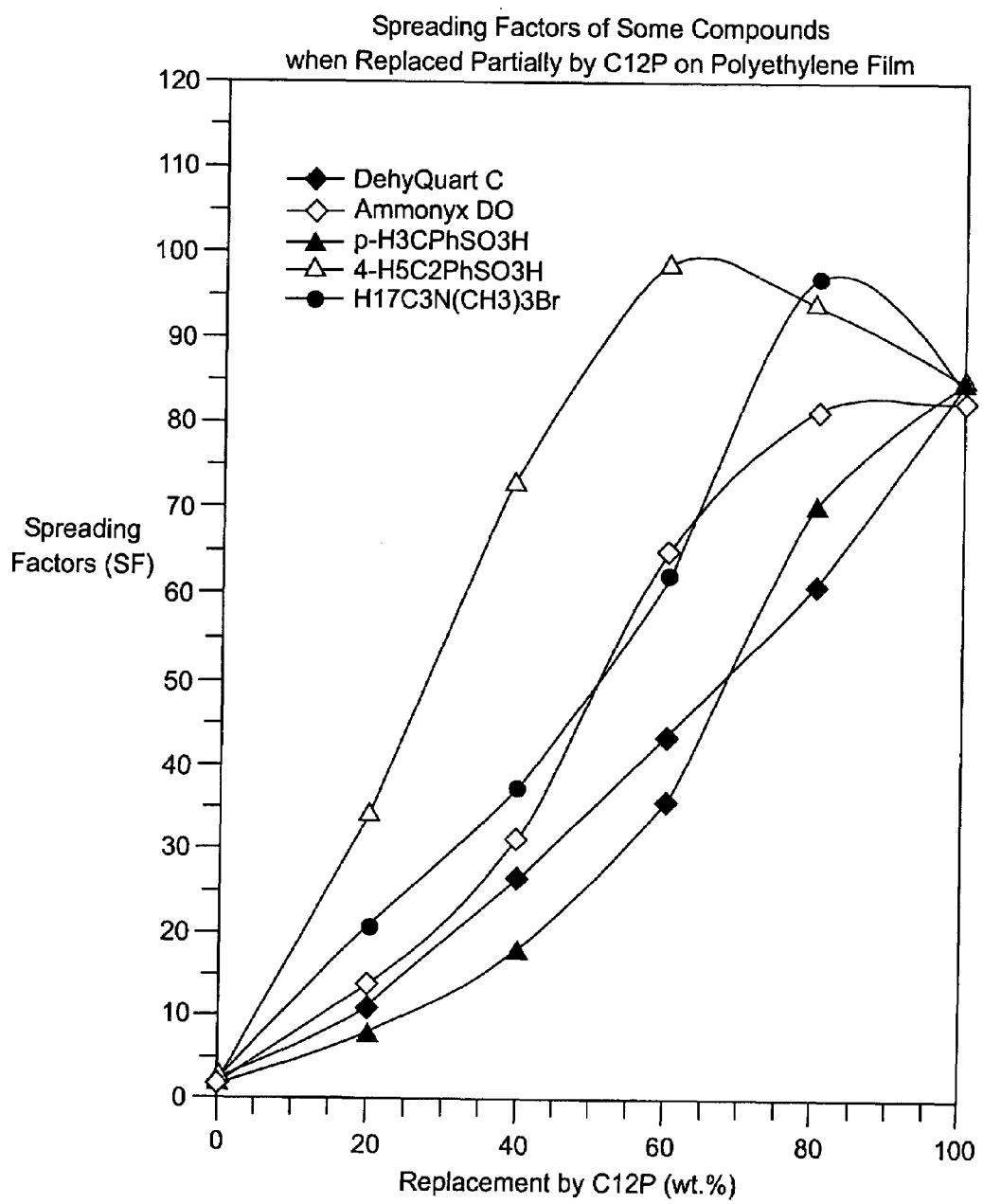
Figure 17:
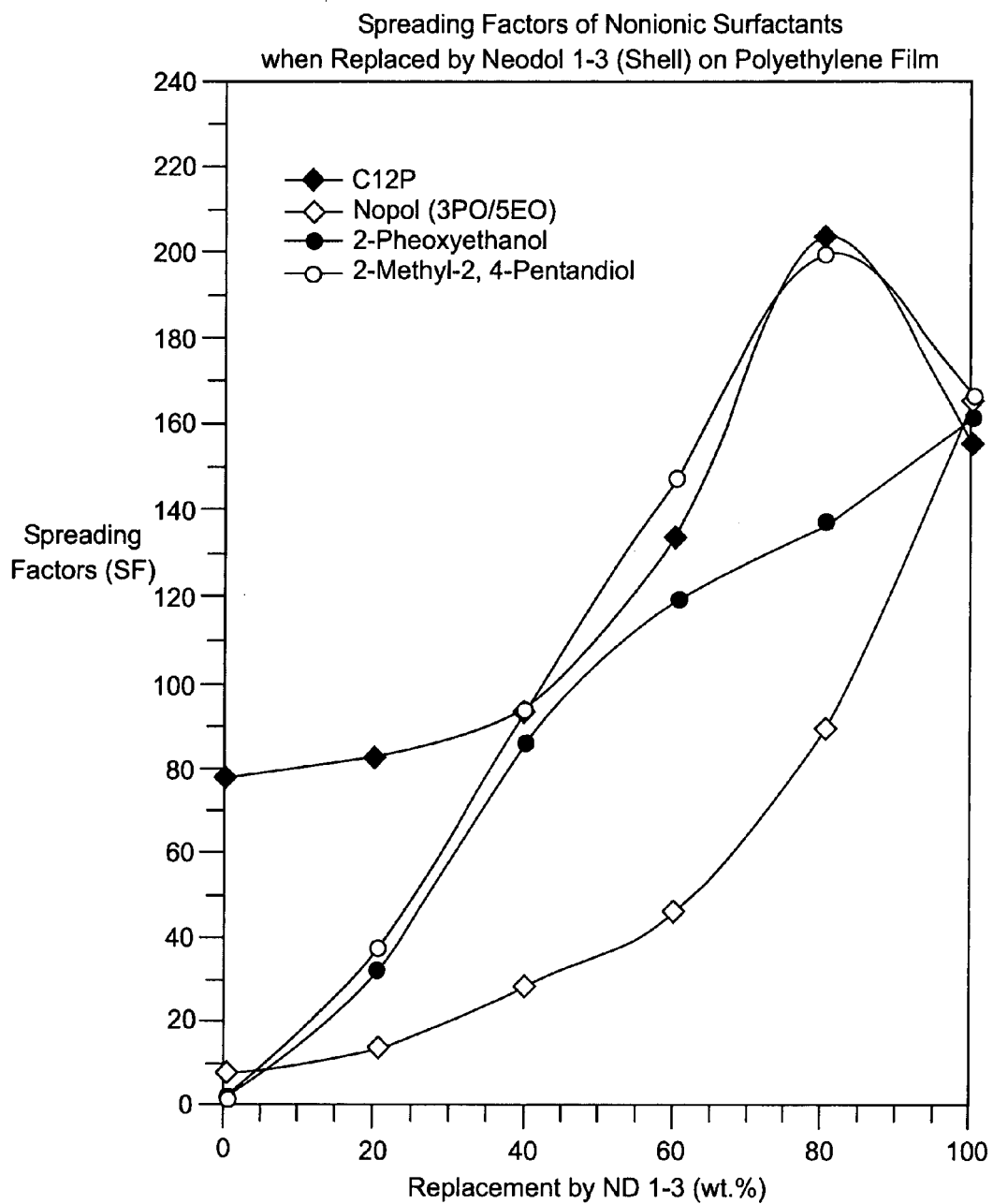
Figure 18:
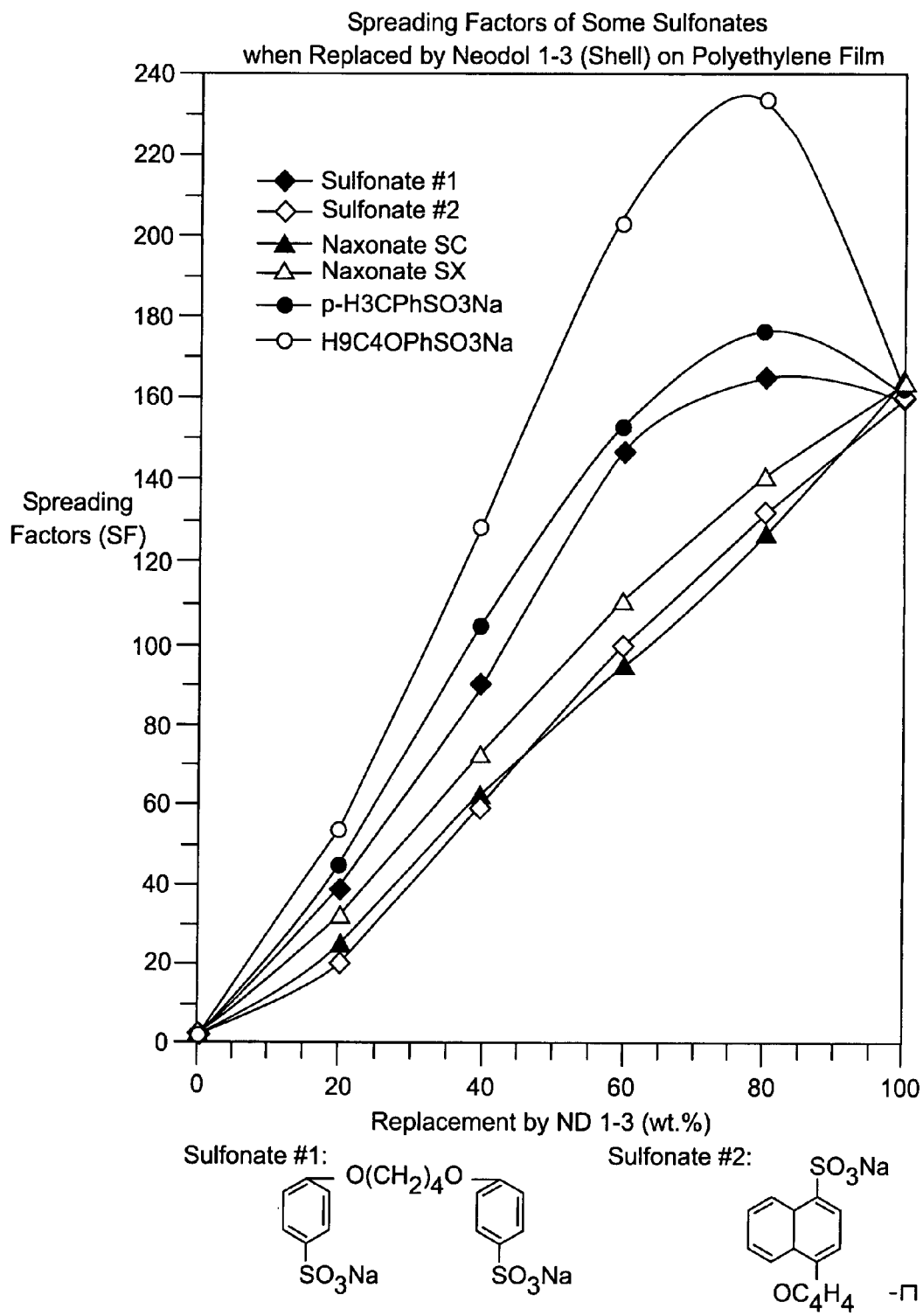
Figure 19:
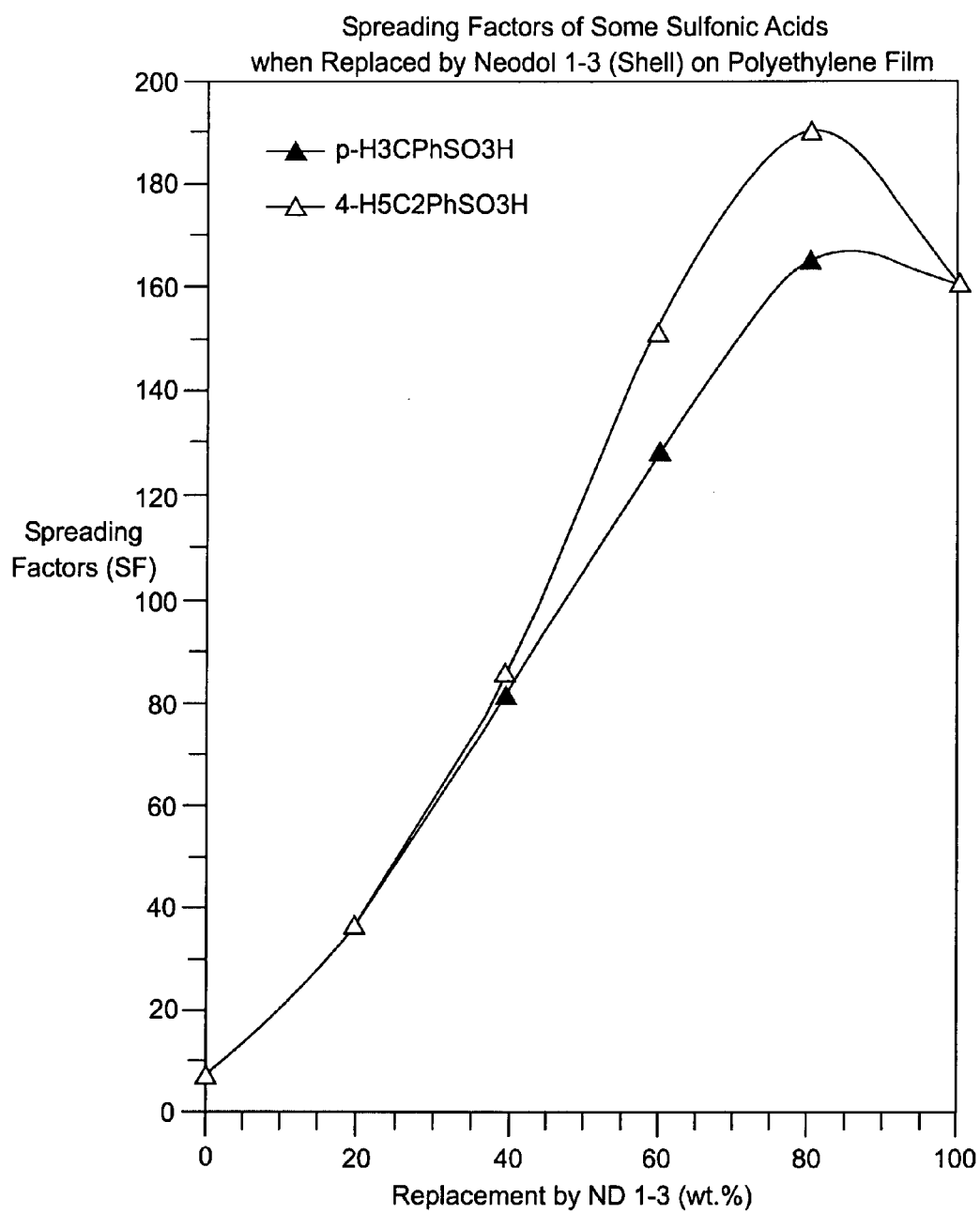
Figure 20:
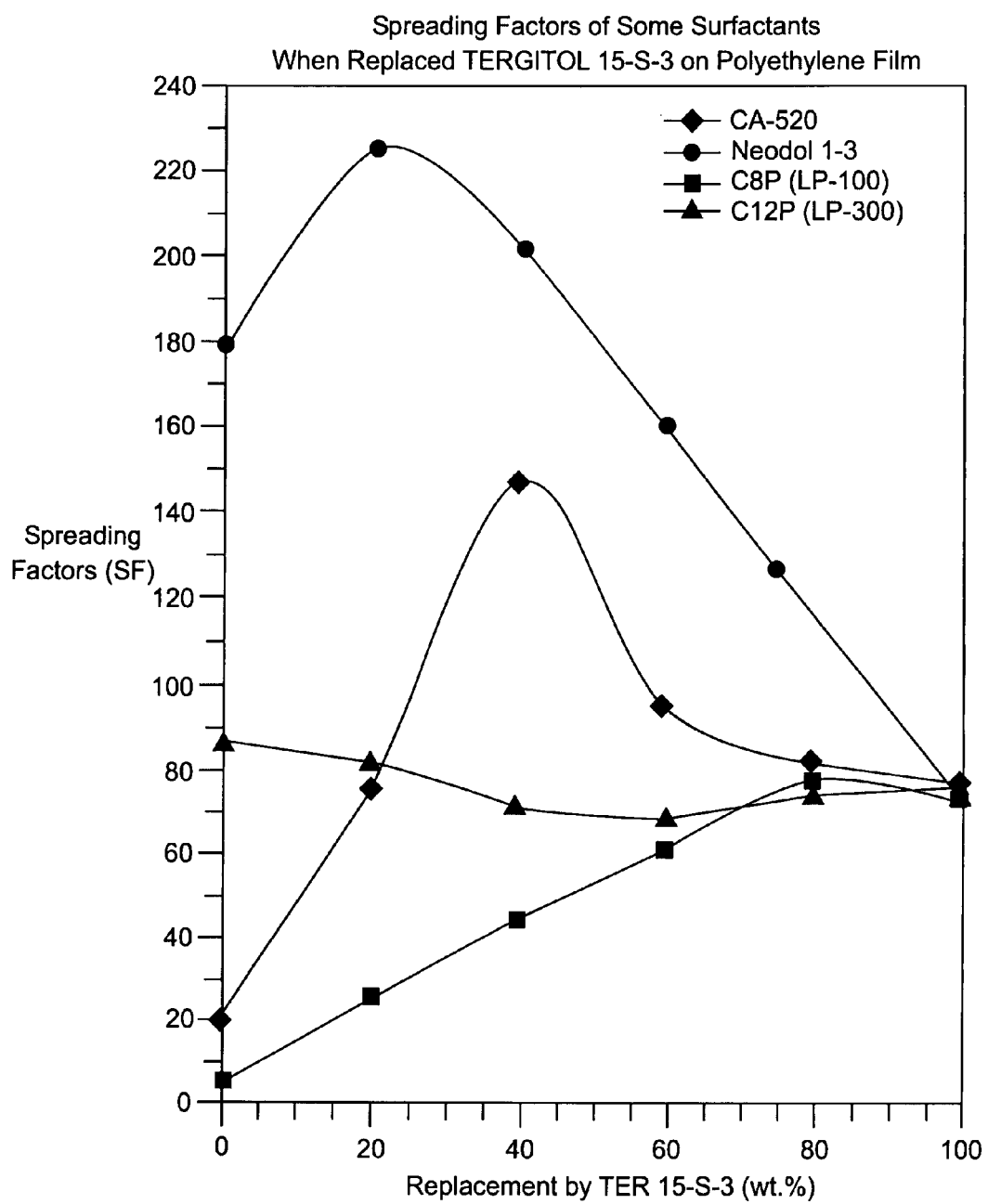
Figure 21:
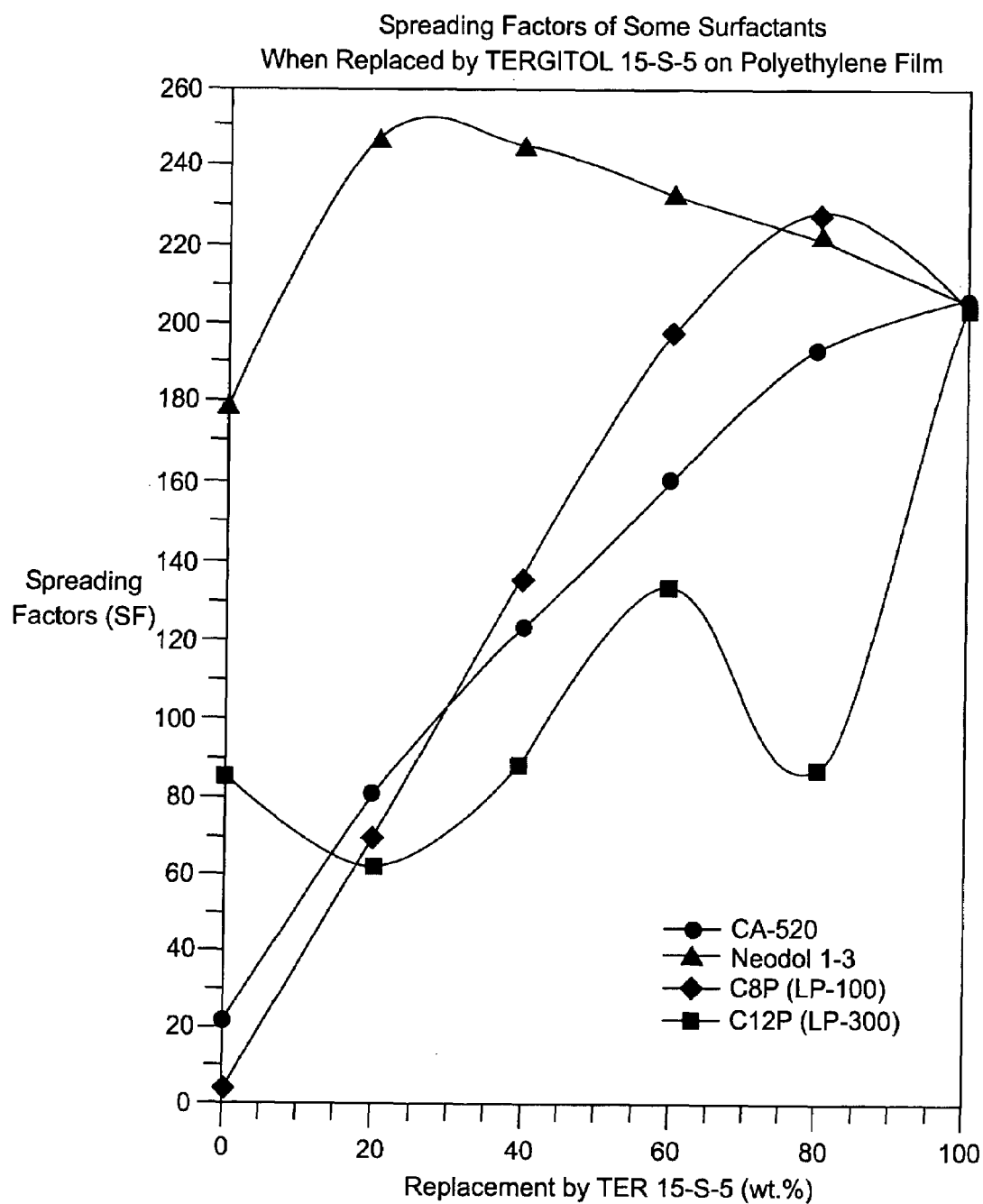
Figure 22:
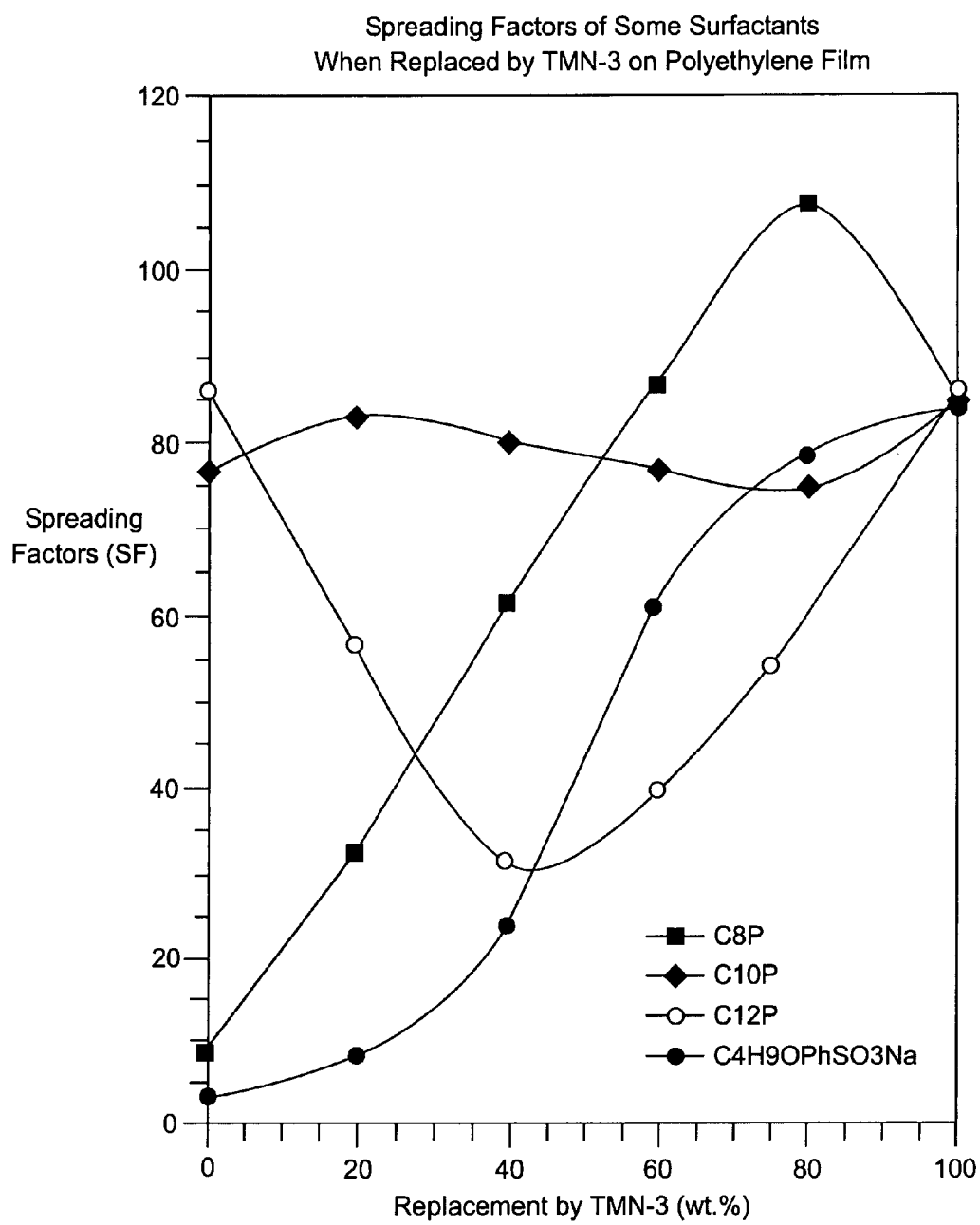

ENHANCEMENT OF THE WETTING OF HYDROPHOBIC SURFACES BY AQUEOUS SURFACTANT SOLUTIONS

This application is a continuation-in-part and claims priority from application Ser. No. 10/318,321, filed on Dec. 12, 2002 now abandoned, which is a continuation-in-part of application Ser. No. 10/213,927, filed on Aug. 7, 2002 now abandoned.

BACKGROUND OF INVENTION

The present invention relates to the spreading (wetting) of aqueous solutions on water-repellent (hydrophobic) surfaces. In particular, the present invention relates to combinations of surfactants which provide improved spreading of aqueous solutions on solid hydrophobic surfaces.

Pure water does not spread on hydrophobic surfaces. When a drop of water comes in contact with such a surface, it forms a more or less spherical droplet that makes a large contact angle (e.g., 90° or more, measured in the water) with the surface. The addition of a surfactant to the water decreases the contact angle that the water makes with the surface, and causes the water to spread over the surface. For a droplet of fixed volume, the smaller the contact angle that the aqueous solution makes with the surface, the larger will be the area that the solution will spread over the surface.

The decrease in the contact angle and consequent increase in the area spread by the aqueous solution over the hydrophobic substrate depends upon the nature and concentration of the added surfactant. Some surfactants, at the concentrations generally used for this purpose (0.1% or less in the aqueous phase), are very effective at increasing the spreading area, while others are not. Surfactants whose molecular structure contains a hydrophilic group that carries no formal charge are often used for improving the spreading of aqueous media on hydrophobic substrates. The absence of a formal charge on such nonionic surfactant molecules makes them less sensitive to electrolytes and other charged components of the aqueous formulations.

The enhancement of spreading or wetting of aqueous solutions on solid water-repellent surfaces is an important "performance property" of surfactants. The wetting of solid surfaces is important in many industrial and consumer processes such as: 1) the cleaning of greasy industrial equipment (machinery, automotive parts), 2) the coating of or printing on water-repellent surfaces, such as polyethylene film, 3) the spreading of herbicides and pesticides on plant leaves (which are generally water repellent), 4) the shampooing of hair coated with body oils, and 5) the cleaning of greasy consumer items (e.g., cooking equipment).

When the surface is highly water repellent (e.g., polyethylene, waxy leaves), many surfactants are not suitable for this purpose, since their aqueous solutions do not spread well. Examples of such surfactants include those that contain hydrocarbon chains.

Trisiloxane-based surfactants are excellent wetting agents for hydrophobic surfaces. Their aqueous solutions spread over much greater areas than do surfactants with hydrocarbon chain hydrophobic groups. Accordingly, surfactants with trisiloxane hydrophobic groups are often called "superspreaders" or "superwetters." However, these trisiloxane-based surfactants are much more expensive than hydrocarbon chain surfactants. In addition, trisiloxane-based surfactants are unstable in aqueous solution unless the pH of the solution is neutral. Therefore, there is a need for less expensive surfactants and surfactants which can be used over a wide pH range.

SUMMARY OF THE INVENTION

In one embodiment, the present invention relates to a solid hydrophobic surface wetted with an aqueous solution comprising a combination of a first surfactant, which comprises a first straight-chain, branched chain or cyclic hydrocarbon chain and a first hydrophilic moiety, and a second surfactant, which comprises a second straight-chain, branched chain or cyclic hydrocarbon chain and a second hydrophilic moiety, wherein: the first and second straight-chain, branched chain or cyclic hydrocarbon chains may or may not be the same; the first and second hydrophilic moieties are not the same; and the first surfactant is added to the second surfactant in an amount that causes a synergistic increase in the spreading factor on the hydrophobic surface. The present invention also relates to a solid hydrophobic surface sequentially wetted with a first aqueous solution comprising a first surfactant, which comprises a first straight-chain, branched chain or cyclic hydrocarbon chain and a first hydrophilic moiety, and a second aqueous solution comprising a second surfactant, which comprises a second straight-chain, branched chain or cyclic hydrocarbon chain or cyclic hydrocarbon chain and a second hydrophilic moiety, wherein: the first and second straight-chain, branched chain or cyclic hydrocarbon chains may or may not be the same; the first and second hydrophilic moieties are not the same; and the first surfactant is added to the second surfactant in an amount that causes a synergistic increase in the spreading factor on the hydrophobic surface.

In a second embodiment, the present invention relates to an aqueous solution for wetting a hydrophobic solid surface comprising a combination of a first surfactant, which comprises a first straight-chain, branched chain or cyclic hydrocarbon chain and a first hydrophilic moiety, and a second surfactant, which comprises a second straight-chain, branched chain or cyclic hydrocarbon chain and a second hydrophilic moiety, wherein: the first and second straight-chain, branched chain or cyclic hydrocarbon chains may or may not be the same; the first and second hydrophilic moieties are not the same; and the first surfactant is added to the second surfactant in an amount that causes a synergistic increase in the spreading factor on the hydrophobic surface. The present invention also relates to a two component aqueous solution for wetting a hydrophobic solid surface, wherein a first aqueous solution is applied to the hydrophobic solid surface and subsequently, a second aqueous solution is applied to the first solution. The two component aqueous solution comprises the first aqueous solution which comprises a first surfactant comprising a first straight-chain, branched chain or cyclic hydrocarbon chain and a first hydrophilic moiety, and the second aqueous solution which comprises a second surfactant comprising a second straight-chain, branched chain or cyclic hydrocarbon chain and a second hydrophilic moiety, wherein: the first and second straight-chain, branched chain or cyclic hydrocarbon chains may or may not be the same; the first and second hydrophilic moieties are not the same; and the first surfactant is added to the second surfactant in an amount that causes a synergistic increase in the spreading factor on the hydrophobic surface.

In a third embodiment, the present invention relates to a method for improving the wetting properties on a hydrophobic surface, the method comprising adding to the hydrophobic surface an aqueous solution comprising a combination of a first surfactant comprising a first hydrocarbon chain and a first hydrophilic moiety, and a second surfactant comprising a second hydrocarbon chain and a second hydrophilic moiety, wherein: the first and second hydrocarbon chains may or may not be the same; the first and second hydrophilic moieties are not the same; and the first surfactant is added to the second surfactant in an amount that causes a synergistic increase in the spreading factor on the hydrophobic surface.

BRIEF DESCRIPTION OF THE FIGURES

Other objects and many attendant features of this invention will be readily appreciated as the invention becomes better understood by reference to the following detailed description when considered in connection with the accompanying drawings wherein:

FIG. 1 is a graph showing the spreading factors versus the weight percent of butyl pyrrolidone for aqueous solutions containing combinations of butyl pyrrolidone and other surfactants.

FIG. 2 is a graph showing the spreading factors versus the weight percent of butyl pyrrolidone for aqueous solutions containing combinations of butyl pyrrolidone and other surfactants.

FIG. 3 is a graph showing the spreading factors versus the weight percent of N-cyclohexyl-2-pyrrolidinone for aqueous solutions containing combinations of N-cyclohexyl-2-pyrrolidinone and other surfactants.

FIG. 4 is a graph showing the spreading factors versus the weight percent of N-cyclohexyl-2-pyrrolidinone for aqueous solutions containing combinations of N-cyclohexyl-2-pyrrolidinone and other surfactants.

FIG. 5 is a graph showing the spreading factors versus the weight percent of N-hexyl-2-pyrrolidinone for aqueous solutions containing combinations of N-hexyl-2-pyrrolidinone and other surfactants.

FIG. 6 is a graph showing the spreading factors versus the weight percent of N-hexyl-2-pyrrolidinone for aqueous solutions containing combinations of N-hexyl-2-pyrrolidinone and other surfactants.

FIG. 7 is a graph showing the spreading factors versus the weight percent of N-(2'-ethylhexyl)-2-pyrrolidinone for aqueous solutions containing combinations of N-(2'-ethylhexyl)-2-pyrrolidinone and other surfactants.

FIG. 8 is a graph showing the spreading factors versus the weight percent of N-(2'-ethylhexyl)-2-pyrrolidinone for aqueous solutions containing combinations of N-(2'-ethylhexyl)-2-pyrrolidinone and other surfactants.

FIG. 9 is a graph showing the spreading factors versus the weight percent of N-octyl-2-pyrrolidinone for aqueous solutions containing combinations of N-octyl-2-pyrrolidinone and other surfactants.

FIG. 10 is a graph showing the spreading factors versus the weight percent of N-octyl-2-pyrrolidinone for aqueous solutions containing combinations of N-octyl-2-pyrrolidinone and other surfactants.

FIG. 11 is a graph showing the spreading factors versus the weight percent of N-decyl-2-pyrrolidinone for aqueous solutions containing combinations of N-decyl-2-pyrrolidinone and other surfactants.

FIG. 12 is a graph showing the spreading factors versus the weight percent of N-decyl-2-pyrrolidinone for aqueous solutions containing combinations of N-decyl-2-pyrrolidinone and other surfactants.

FIG. 13 is a graph showing the spreading factors versus the weight percent of N-dodecyl-2-pyrrolidinone for aqueous solutions containing combinations of N-dodecyl-2-pyrrolidinone and other surfactants.

FIG. 14 is a graph showing the spreading factors versus the weight percent of N-dodecyl-2-pyrrolidinone for aqueous solutions containing combinations of N-dodecyl-2-pyrrolidinone and other surfactants.

FIG. 15 is a graph showing the spreading factors versus the weight percent of N-dodecyl-2-pyrrolidinone for aqueous solutions containing combinations of N-dodecyl-2-pyrrolidinone and other surfactants.

FIG. 16 is a graph showing the spreading factors versus the weight percent of N-dodecyl-2-pyrrolidinone for aqueous solutions containing combinations of N-dodecyl-2-pyrrolidinone and other surfactants.

FIG. 17 is a graph showing the spreading factors versus the weight percent of Neodol 1-3 ($C_nH_m(OC_2H_4)_xOH$, wherein n is an average of 11, m is an average of 23 and x is an average of 3) for aqueous solutions containing combinations of Neodol 1-3 and other surfactants.

FIG. 18 is a graph showing the spreading factors versus the weight percent of Neodol 1-3 for aqueous solutions containing combinations of Neodol 1-3 and other surfactants.

FIG. 19 is a graph showing the spreading factors versus the weight percent of Neodol 1-3 for aqueous solutions containing combinations of Neodol 1-3 and other surfactants.

FIG. 20 is a graph showing the spreading factors versus the weight percent of Tergitol 15-S-3, a secondary alcohol ethoxylate, $C_nH_m(OC_2H_4)_xOH$, where n is 12-14, m is 25-29, and x is an average of 3 for aqueous solutions containing combinations of Tergitol 15-S-3 and other surfactants.

FIG. 21 is a graph showing the spreading factors versus the weight percent of Tergitol 15-S-5, a secondary alcohol ethoxylate, $C_nH_m(OC_2H_4)_xOH$, where n is 12-14, m is 25-29, and x is an average of 5 for aqueous solutions containing combinations of Tergitol 15-S-5 and other surfactants.

FIG. 22 is a graph showing the spreading factors versus the weight percent of TMN-3, an ethenoxylated $C_{12}$ branched alcohol, $C_{12}H_{25}$(branched)$(OC_2H_4)_xOH$, where x is an average of 3 for aqueous solutions containing combinations of TMN-3 and other surfactants.

FIG. 23 is a graph showing the spreading factors versus the weight percent of sodium decyl sulfonate, $C_{10}H_{21}SO_3^-Na^+$, when of sodium decyl sulfonate and a second surfactant are sequentially applied to a polyethylene film.

FIG. 24 is a graph showing the spreading factors versus the weight percent of sodium decyl sulfonate, $C_{10}H_{21}SO_3^-Na^+$, when of sodium decyl sulfonate and a cationic surfactant are sequentially applied to a polyethylene film.

FIG. 25 is a graph showing the spreading factors versus the weight percent of sodium dodecyl sulfonate, $C_{10}H_{21}SO_4^-Na^+$, when sodium dodecyl sulfonate and a cationic surfactant are sequentially applied to a polyethylene film.

FIG. 26 is a graph showing the spreading factors versus the weight percent of N-dodecyl-2-pyrrolidinone for aqueous solutions containing combinations of N-dodecyl-2-pyrrolidinone and other surfactants on oil-covered glass.

FIG. 27 is a graph showing the spreading factors versus the weight percent of N-dodecyl-2-pyrrolidinone for aqueous solutions containing combinations of N-dodecyl-2-pyrrolidinone and other surfactants on oil-covered glass.

FIG. 28 is a graph showing the spreading factors versus the weight percent of N-octyl-pyrrolidinone for aqueous solutions containing combinations of N-octyl-pyrrolidinone and other surfactants on oil-covered glass.

DETAILED DESCRIPTION OF THE INVENTION

The present invention is based on the discovery that certain mixtures of at least two different surfactants having hydrocarbon chains can show synergy in spreading on water repellent surfaces. Preferably, the mixtures include two nonionic surfactants.

It has surprisingly been found that an aqueous solution of the two combined surfactants, at certain proportions to each other, will spread to a considerably larger area on a solid hydrophobic surface, e.g., a polyethylene film, than an aqueous solution of either of the two surfactants at the same weight concentration by itself. It was unexpected that two different hydrocarbon chain surfactants would exhibit such synergy in a "performance property" such as wetting or spreading on hydrophobic surfaces.

The synergetic increase in spreading area can be so large that the mixtures can spread to areas approaching those attained by trisiloxane-based "superspreaders," in spite of the fact that neither surfactant of the synergetic mixture contains a trisiloxane hydrophobic group. Since these mixtures of hydrocarbon-chain surfactant are much less expensive than trisiloxane-based surfactants (about 10% of the cost), they can be used as replacements for much more expensive trisiloxane-based surfactants.

The mixtures of hydrocarbon-chain surfactant of the present invention are also stable over a wider pH range (e.g., 3-11) than trisiloxane-based surfactants which are much more pH-sensitive. The aqueous solutions of the present invention can be used in the applications where trisiloxane-based surfactants are now being used and for other applications involving the spreading of aqueous solutions over water-repellent solid surfaces.

The solid hydrophobic surface may be any surface that is wetted by the aqueous solution of the present invention. Some examples of such surfaces include oil-covered surfaces, metal, glass, plastic, acrylic or painted surfaces, as well as plants and tree leaves. The method used for applying the aqueous solutions are well known to those skilled in the art.

In a preferred embodiment, the present invention relates to a solid hydrophobic surface wetted with an aqueous solution comprising a combination of a first surfactant and a second surfactant. The first surfactant includes a first hydrocarbon chain and a first hydrophilic moiety. The second surfactant includes a second hydrocarbon chain and a second hydrophilic moiety. The first and second hydrocarbon chains may or may not be the same; the first and second hydrophilic moieties are not the same.

In a preferred embodiment, the hydrocarbon chain comprises a minimum of four carbon atoms, preferably six, more preferably eight, and most preferably ten carbon atoms. The maximum number of carbon atoms in the chain is preferably twenty four, more preferably twenty, and most preferably sixteen or eighteen.

The hydrocarbon chain may be saturated. Some examples of saturated hydrocarbon chains include n-butyl, n-pentyl, n-hexyl, n-heptyl, n-octyl, n-nonyl, n-decyl, n-undecyl, n-dodecyl, tridecyl, n-tetradecyl, pentadecyl, n-hexadecyl, heptadecyl, n-octadecyl, and n-eicosyl.

Alternatively, the hydrocarbon chain may include one or more double or triple bonds. The maximum number of double or triple bonds is limited only by the length of the chain. For example, a six member chain has a maximum of three double or triple bonds; an eight member chain has a maximum of four double or triple bonds; a ten member chain has a maximum of five double or triple bonds, etc. Each double bond may be in the cis or trans configuration. Some examples of unsaturated chains include 2-butenyl, 3-hexynyl, oleyl, linoleyl, linolenyl and eleostearyl.

The hydrocarbon chain may be branched. For example, any of the carbon atoms in the hydrocarbon chains described above may be bonded to a $C_1$-$C_4$ alkyl, alkenyl, or alkynyl group. Some examples of $C_1$-$C_4$ alkyl, alkenyl, or alkynyl groups are methyl, ethyl, propyl, isopropyl, butyl, isobutyl, butadienyl, isobutenyl, butynyl, etc. Some examples of branched hydrocarbon chains include 2-ethylhexyl, 3,7,11, 15-tetramethylhexadecyl, cis or trans 3,7,11,15-tetramethyl-2-hexadecenyl, and 2-methyl-2,4-pentadiyl.

Any of the carbon atoms in any of the hydrocarbon chains described above may be bonded to a hydrocarbon ring structure. The hydrocarbon ring may be saturated or unsaturated. Examples of hydrocarbon rings include cyclopentyl, cyclopentenyl, cyclohexyl, and phenyl. The hydrocarbon chains may include combinations of hydrocarbon chains and hydrocarbon rings, such as nonylphenyl or t-octylphenyl.

The hydrocarbon chains and rings in a surfactant may be homogenous or heterogenous. Heterogenous hydrocarbon chains may, for example, be mixtures that occur naturally. Some sources of natural heterogenous hydrocarbon chains, or their precursors, include, for example, fats and oils, such as beef tallow, butter, lard, coconut oil, corn oil, cottonseed oil, olive oil, palm oil, peanut oil, soybean oil, and linseed oil. Heterogeneous chains may also be from petrochemically-derived manufactured products.

The first and second hydrophilic moieties are different, and may be nonionic, anionic, cationic or zwitterionic. The hydrophilic moiety may, for example, be a nonionic group. The nonionic group may be, for example, a polyalkyleneoxide, a pyrrolidinone, a mono- and polyglycoside, or other di- or polyhydroxy group. The polyalkyleneoxide can be selected from the group consisting of polyethylene oxide, polypropylene oxide, random or block copolymers of ethylene oxide and propylene oxide, and mixtures thereof, such that the resulting surfactant blend is water dispersible or water soluble. In a preferred embodiment, the hydrophilic moieties comprise a minimum of one and a maximum of six ethylene oxide units, a pyrrolidinonyl group or a polyhydroxy group, preferably 2-6 hydroxyl groups.

The hydrophilic moiety may also be an anionic group. The anionic group may be, for example, a sulfonate, a sulfate, an ethoxysulfate, a phosphate ester, or a carboxylate group. The counterion ($M^+$) may be any positively charged moiety. The counterion may, for example, be sodium, potassium, lithium, ammonium, trimethylammonium, diethanolammonium, or triethanolammonium. Some examples of organic compounds having anionic moieties that are employed in the surfactant blend of the present invention include benzenesulfonate and alkoxybenzenesulfonate.

Alternatively, the hydrophilic moiety is a cationic group. The cationic group may, for example, be selected from the group consisting of a protonated tertiary amine, a quaternary ammonium, a quaternary imidazolinium, pyridinium, and mixtures thereof. The counterion ($X^-$) may be any negatively charged group. The counterion may be, for example, acetate, chloride, or bromide. An example of a hydrocarbon chain having a cationic moiety employed in the surfactant blend of the present invention is octyltrimethylammonium bromide.

The hydrophilic moiety may also be a zwitterionic group. The zwitterionic group may, for example, be a caprylamphocarboxylate (Miranol JA from Rhodia).

The solid hydrophobic surface can include any hydrophobic surface having a contact angle greater than 90 degrees with water. Examples of such hydrophobic surfaces are plastic, for example polyethylene or polypropylene surfaces, or oil-covered glass surfaces. In one embodiment, the solid hydrophobic surface is coated with grease or wax or with gasoline, motor oil, or a combination thereof. The solid hydrophobic surface can be an oil-coated windshield or leaf of a plant (e.g., crop plant, ornamental plant or weed) or a tree.

In one embodiment, the first surfactant is a carboxylate, an organic sulfonate, an organic sulfate, a quaternary ammonium compound, a betaine, an alkyl amino acid, or an amine oxide and the second surfactant is a N-alkyl-2-pyrrolidinone, wherein the alkyl group is saturated or unsaturated straight-chain, branched chain or cyclic alkyl and has 4 to 16 carbon atoms. In another embodiment, the second surfactant is an ethenoxylated alcohol or propenoxylated alcohol, wherein the alkyl group is straight chain and saturated or unsaturated. In a preferred embodiment, the first surfactant is a carboxylate, an organic sulfonate, an organic sulfate, a quaternary ammonium compound, a betaine, an alkyl amino acid, or an amine oxide and the second surfactant is an ethenoxylated alcohol or propenoxylated alcohol, wherein the alkyl group of the alcohol is straight chain and saturated or unsaturated.

In another embodiment, an aqueous solution for wetting a hydrophobic solid surface is provided. The aqueous solution includes a combination of a first surfactant, which includes a first straight-chain, branched chain or cyclic hydrocarbon chain hydrocarbon chain and a first hydrophilic moiety, and a second surfactant, which includes a second straight-chain, branched chain or cyclic hydrocarbon chain hydrocarbon chain and a second hydrophilic moiety. The first and second hydrocarbon chains may or may not be the same. The first surfactant, the first hydrocarbon chain, the first hydrophilic moiety, the second surfactant, the second hydrocarbon chain, the second hydrophilic moiety may be any of those described above.

The first surfactant and the second surfactant are added to an aqueous solution in an amount that causes a synergistic increase in the spreading factor of the solution on a solid hydrophobic surface. Most preferably, the minimum total amount of the first and second surfactants is about 0.01 percent by weight and the maximum total amount of the first and second surfactants is about 1.0 percent by weight of the aqueous solution. The aqueous solution preferably comprises deionized water and the first and second surfactants. In addition, the aqueous solution can include degreasing agents, pesticides, herbicides or other agricultural adjuvants.

In still another embodiment of the present invention, a method for improving the wetting of a hydrophobic surface is provided. The method includes adding to the hydrophobic surface one of the aqueous solutions described above.

In a first embodiment, a first surfactant is pre-mixed with a second surfactant in an aqueous solution. In a second embodiment, the first and second surfactants are prepared in separate aqueous solutions and applied to a hydrophobic surface sequentially. The second embodiment is especially useful when aqueous solutions of the two surfactants, when mixed, produce insoluble material. It has also surprisingly been found that drops of a first aqueous solution containing a first surfactant and a second aqueous solution containing a second surfactant, at certain proportions to each other and applied sequentially, will spread to a considerably larger area on a hydrophobic surface, e.g., a polyethylene film, than an aqueous solution of either of the two surfactants at the same weight concentration by itself.

In a second embodiment, if the two surfactants are immiscible, e.g. a solution of the two surfactants is cloudy, it is preferable to form two separate aqueous solutions for each of the surfactants and to sequentially apply them separately to the hydrophobic surface to be treated. A first aqueous solution containing a first hydrocarbon surfactant is applied to a hydrophobic surface. A second aqueous solution containing a second hydrocarbon surfactant is then applied to the first aqueous solution on the hydrophobic surface. When the first surfactant contacts the second surfactant in a sufficient amount, it causes a synergistic effect and increases the spreading factor on the hydrophobic surface. In a most preferred embodiment, the two surfactants are ionic, wherein one surfactant is anionic and the other surfactant is cationic.

The present invention improves the wetting properties on a hydrophobic surface using a combination of surfactants that provide a synergistic increase in the spreading factor. This synergistic increase in the spreading factor allows less expensive surfactants to be used in place of more expensive surfactants. In all of the embodiments of the present invention, the surfactants are applied in an amount sufficient to wet the surfaces solid hydrophobic surface.

As used in the context of the present invention, the term "Spreading Factor" or "SF" is defined to mean the ratio of the area over which a given volume of aqueous surfactant solution, containing a given percent by weight of surfactant, will spread in a given time over the hydrophobic surface, compared to the area over which the same volume of water will spread in the same time.

The amounts of the first and second surfactants that are combined to create a synergistic effect can be determined from the graphs in FIGS. 1-28. These graphs show the spreading factors for different combinations of two surfactants. For example, FIG. 1 shows curves for the combination of six different surfactants and $C_4P$ (N-hexyl-2-pyrrolidinone). The uppermost curve plots the spreading factor for the surfactant CO-430

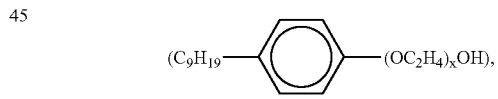

wherein x is an average of 4 when it is combined with $C_4P$. The point on the curve at the y-axis (represented by an open triangle) shows that the spreading factor for 100% CO-430 is about 22.5. The x-axis shows the percentage of $C_4P$ that is combined with CO-430. The result is plotted to form the curve. The open triangles on the curve show that the spreading factor was measured for combinations of 80%-20%, 60%-40%, 40%-60%, 20%-80% and 0%-100% of CO-430 and $C_4P$. The point on the curve where 100% $C_4P$ is measured shows that the spreading factor for $C_4P$ is about 2.5.

If the combination of the two surfactants had a linear relationship, the curve would be a straight line from the point on the y-axis where 100% CO-430 was measured to the point where the spreading factor of 100% $C_4P$ was measured. However, the actual curve for the different combinations of CO-430 and $C_4P$ is significantly above the theoretical straight line. This indicates that there is a synergistic effect when the two surfactants are combined. The maximum synergy is found at the highest point on the curve which occurs when the combination is about 75%-25% CO-430 to $C_4P$.

For practical applications, the preferred combinations occur when the spreading factor for the combination of two surfactants is greater than the spreading factor of the higher of the two surfactants. In terms of the CO-430-$C_4P$ combinations plotted in FIG. 1, the preferred combinations yield a spreading factor that is greater than 22.5 (the spreading factor for 100% CO-430). Thus, the preferred combinations would have between 99% CO-430-1% $C_4P$ and 35% CO-430-65% $C_4P$. These combinations represent the points on the curve that are above a spreading factor of 22.5. More preferred combinations have between 90% CO-430-10% $C_4P$ and 50% CO-430-50% $C_4P$ and provide spreading factors greater than 29. The most preferred combinations have between 80% CO-430-20% $C_4P$ and 60% CO-430-40% $C_4P$ and provide spreading factors greater than 33.

By referring to FIGS. 1-28 and determining the portion of the curve that has a spreading factor greater than the spreading factor of the higher of the two surfactants, it is possible to identify preferred ranges for the combinations of the two surfactants. The more preferred ranges provide higher spreading factors. The most preferred ranges are near the top of the curve. Also, the greater the upward slope of the curve, the greater is the synergy between the two surfactants.

The preferred surfactants that can be used in the present invention are:

an ethenoxylated alcohol, such as $C_nH_m(OC_2H_4)_xOH$, wherein n is an average of 11, m is an average of 23 and x is an average of 3 (available from Shell Chemical Company under the tradename Neodol 1-3); $C_nH_m(OC_2H_4)_xOH$, wherein n is an average of 11, m is an average of 23 and x is an average of 5 (available from Shell Chemical Company under the tradename Neodol 1-5); $C_nH_m(OC_2H_4)_xOH$, wherein n is 12 or 13, m is an average of 25 or 27 and x is an average of 4 (available from Shell Chemical Company under the tradename Neodol 23-4); $C_nH_m(OC_2H_4)_xOH$, wherein n is 12-15, m is 25-31 and x is an average of 3 (available from Shell Chemical Company under the tradename Neodol 25-3); $C_nH_m(OC_2H_4)_xOH$, wherein n is 12-14, m is 25-29 and x is an average of 5 (available from Shell Chemical Company under the tradename Neodol 23-5); or an ethenoxylated branched $C_{12}$ alcohol, preferably $C_{12}H_{25}$(branched)$(OC_2H_4)_xOH$, wherein x is an average of 8 (available from Dow Chemical Company under the tradename Tergitol TMN-6);

a branched $C_{n\text{-}}H_m$ (secondary) $(OC_2H_4)_xOH$, wherein n is 12-14, m is 25-29 and x is an average of 3 (available from Dow Chemical Company under the tradename TERGITOL 15-S-3); or a branched $C_{n\text{-}}H_m$ (secondary) $(OC_2H_4)_xOH$, wherein n is 12-14, m is 25-29 and x is an average of 5 (available from Dow Chemical Company under the tradename TERGITOL 15-S-5);

an ethenoxylated nonylphenol, preferably

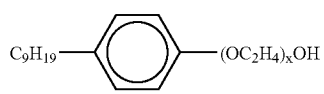

wherein x is an average of 4 or 9 (available from Rhodia, Inc. under the tradename Igepal CO-430 and CO-630);

an ethenoxylated t-octylphenol

wherein x is an average of 5 or 7 (available from Rhodia, Inc. under the tradename Igepal CA-520 and CA-620);

N-butyl-2-pyrrolidinone($C_4P$), N-hexyl-2-pyrrolidinone ($C_6P$), N-(2'-ethylhexyl)-2-pyrrolidinone($C_{2,6}P$), N-decyl-2-pyrrolidinone ($C_{10}P$), N-dodecyl-2-pyrrolidinone($C_{12}P$), N-octyl-2-pyrrolidinone($C_8P$), N-cyclohexyl-2-pyrrolidinone (CHP);

a short-chain, branched alkanediol, preferably 2-methyl-2,4-pentanediol;

a short-chain, alkoxylbenzenesulfonate, preferably $H_9C_4OPhSO_3Na$;

a short-chain alkylbenzenesulfonic acid, preferably 4-$H_5C_2PhSO_3H$;

a short-chain alkylbenzenesulfonate, preferably sodium xylene sulfonate;

a hexyl diphenyl ether disulfonate (available from Dow Chemical Company under the tradename Dowfax Hydrotrope);

a dialkylsulfosuccinate, preferably sodium di(cyclohexyl) sulfosuccinate;

a dimethyloctynediol;

$H_{17}C_8N(CH_3)_3Br$;

p-$H_3CPhSO_3H$;

sodium decyl sulfonate ($C_{10}H_{21}SO_3^-Na^+$);

dodecyltrimethylammonium bromide ($C_{12}H_{25}(CH_3)_3N^+$ $Br^{-1}$);

dodecyltrimethylammonium chloride ($C_{12}H_{25}(CH_3)_3N^+$ $Cl^-$);

decyltrimethylammonium bromide ($C_{10}H_{21}(CH_3)_3N^+$ $Br^-$);

decylpyridinium bromide ($C_{10}H_{21}Pyr\ N^+Br$)

sodium dodecyl sulfate ($C_{12}H_{25}SO_4^-Na^+$); and decyltrimethylammonium bromide ($C_{10}H_{21}(CH_3)_3N^+$ $B^-$).

The aqueous solution of the present invention includes a combination of a first surfactant and a second surfactant. The preferred combinations include the following:

An aqueous solution, wherein the first surfactant is an ethenoxylated alcohol and the second surfactant is N-butyl-2-pyrrolidinone, preferably the first surfactant is $C_nH_m(OC_2H_4)_xOH$, wherein n is an average of 11, m is an average of 23 and x is an average of 3, and the second surfactant is N-butyl-2-pyrrolidinone. The preferred amount of the second surfactant is from about 1 weight percent to about 30 weight percent of the total amount of surfactants.

An aqueous solution, wherein the first surfactant is an ethenoxylated surfactant and the second surfactant is N-hexyl-2-pyrrolidinone, preferably the first surfactant is $C_nH_m(OC_2H_4)_xOH$, wherein n is an average of 11, m is an average of 23 and x is an average of 3, and the second surfactant is N-hexyl-2-pyrrolidinone. The preferred amount of the second surfactant is from about 1 weight percent to about 30 weight percent of the total amount of surfactants.

An aqueous solution, wherein the first surfactant is an ethenoxylated surfactant and the second surfactant is N-(2'-ethylhexyl)-2-pyrrolidinone, preferably the first surfactant is $C_nH_m(OC_2H_4)_xOH$, wherein n is an average of 11, m is an average of 23 and x is an average of 3, and the second surfactant is N-(2'-ethylhexyl)-2-pyrrolidinone. The preferred amount of the second surfactant is from about 1 weight percent to about 40 weight percent of the total amount of surfactants.

An aqueous solution, wherein the first surfactant is an ethenoxylated surfactant and the second surfactant is N-decyl-2-pyrrolidinone, preferably the first surfactant is $C_nH_m(OC_2H_4)_xOH$, wherein n is an average of 11, m is an average of 23 and x is an average of 3, and the second surfactant is N-decyl-2-pyrrolidinone. The preferred amount of the second surfactant is from about 1 weight percent to about 50 weight percent of the total amount of surfactants.

An aqueous solution, wherein the first surfactant is an ethenoxylated surfactant and the second surfactant is N-dodecyl-2-pyrrolidinone, preferably the first surfactant is $C_nH_m(OC_2H_4)_xOH$, wherein n is an average of 11, m is an average of 23 and x is an average of 3, and the second surfactant is N-dodecyl-2-pyrrolidinone. The preferred amount of the second surfactant is from about 1 weight percent to about 30 weight percent of the total amount of surfactants.

An aqueous solution, wherein the first surfactant is an ethenoxylated t-octylphenol and the second surfactant is N-butyl-2-pyrrolidinone, preferably the first surfactant is

wherein x is an average of 5 and the second surfactant is N-butyl-2-pyrrolidinone. The preferred amount of the second surfactant is from about 1 weight percent to about 65 weight percent of the total amount of surfactants.

An aqueous solution, wherein the first surfactant is an ethenoxylated t-octylphenol and the second surfactant is N-hexyl-2-pyrrolidinone, preferably the first surfactant is

wherein x is an average of 5 and the second surfactant is N-hexyl-2-pyrrolidinone. The preferred amount of the second surfactant is from about 1 weight percent to about 90 weight percent of the total amount of surfactants.

An aqueous solution, wherein the first surfactant is an ethenoxylated t-octylphenol and the second surfactant is N-(2'-ethylhexyl)-2-pyrrolidinone, preferably the first surfactant is

wherein x is an average of 5 and the second surfactant is N-(2'-ethylhexyl)-2-pyrrolidinone. The preferred amount of the second surfactant is from about 1 weight percent to about 95 weight percent of the total amount of surfactants.

An aqueous solution, wherein the first surfactant is an ethenoxylated t-octylphenol and the second surfactant is N-octyl-2-pyrrolidinone, preferably the first surfactant is

wherein x is an average of 5 and the second surfactant is N-octyl-2-pyrrolidinone. The preferred amount of the second surfactant is from about 1 weight percent to about 95 weight percent of the total amount of surfactants.

An aqueous solution, wherein the first surfactant is an ethenoxylated t-octylphenol and the second surfactant is N-decyl-2-pyrrolidinone, preferably the first surfactant is

wherein x is an average of 5 and the second surfactant is N-decyl-2-pyrrolidinone. The preferred amount of the second surfactant is from about 20 weight percent to about 99 weight percent of the total amount of surfactants.

An aqueous solution, wherein the first surfactant is an ethenoxylated t-octylphenol and the second surfactant is N-dodecyl-2-pyrrolidinone, preferably the first surfactant is

wherein x is an average of 5 and the second surfactant is N-dodecyl-2-pyrrolidinone. The preferred amount of the second surfactant is from about 30 weight percent to about 99 weight percent of the total amount of surfactants.

An aqueous solution, wherein the first surfactant is an ethenoxylated alcohol, preferably $C_nH_m(OC_2H_4)_xOH$, wherein n is an average of 11, m is an average of 23 and x is an average of 3, and the second surfactant is a short-chain, branched alkanediol, preferably 2-methyl-2,4-pentanediol. When the first surfactant is $C_nH_m(OC_2H_4)_xOH$, wherein n is an average of 11, m is an average of 23 and x is an average of 3, and the second surfactant is 2-methyl-2,4-pentanediol, the preferred amount of the second surfactant is from about 1 weight percent to about 35 weight percent of the total amount of surfactants.

An aqueous solution, wherein the first surfactant is an ethenoxylated alcohol, preferably $C_nH_m(OC_2H_4)_xOH$, wherein n is an average of 11, m is an average of 23 and x is an average of 3, and the second surfactant is a short-chain, alkoxylbenzenesulfonate, preferably $H_9C_4OPhSO_3Na$. When the first surfactant is $C_nH_m(OC_2H_4)_xOH$, wherein n is an average of 11, m is an average of 23 and x is an average of 3, and the second surfactant is $H_9C_4OPhSO_3Na$, the preferred amount of the second surfactant is from about 1 weight percent to about 55 weight percent of the total amount of surfactants.

An aqueous solution, wherein the first surfactant is an ethenoxylated alcohol, preferably $C_nH_m(OC_2H_4)_xOH$, wherein n is an average of 11, m is an average of 23 and x is an average of 3, and the second surfactant is a short-chain alkylbenzenesulfonic acid, preferably $4-H_5C_2PhSO_3H$.

When the first surfactant is $C_nH_m(OC_2H_4)_xOH$, wherein n is an average of 11, m is an average of 23 and x is an average of 3, and the second surfactant is $4-H_5C_2PhSO_3H$, the preferred amount of the second surfactant is from about 1 weight percent to about 40 weight percent of the total amount of surfactants.

An aqueous solution, wherein the first surfactant is N-butyl-2-pyrrolidinone and the second surfactant is an ethenoxylated branched $C_{12}$ alcohol, preferably $C_{12}H_{25}$(branched)$(OC_2H_4)_xOH$, wherein x is an average of 8. The preferred amount of the second surfactant is from about 70 weight percent to about 99 weight percent of the total amount of surfactants.

An aqueous solution, wherein the first surfactant is N-decyl-2-pyrrolidinone and the second surfactant is an ethenoxylated alcohol, preferably $C_nH_m(OC_2H_4)_xOH$, wherein n is an average of 11, m is an average of 23 and x is an average of 5. The preferred amount of the second surfactant is from about 1 weight percent to about 90 weight percent of the total amount of surfactants.

An aqueous solution, wherein the first surfactant is N-decyl-2-pyrrolidinone and the second surfactant is $C_nH_m(OC_2H_4)_xOH$, wherein n is 12 or 13, m is an average of 25 or 27 and x is an average of 4. The preferred amount of the second surfactant is from about 5 weight percent to about 99 weight percent of the total amount of surfactants.

An aqueous solution, wherein the first surfactant is N-decyl-2-pyrrolidinone and the second surfactant is $C_nH_m(OC_2H_4)_xOH$, wherein n is 12 or 13, m is 25 or 27 and x is an average of 4. The preferred amount of the second surfactant is from about 1 weight percent to about 90 weight percent of the total amount of surfactants.

An aqueous solution, wherein the first surfactant is N-dodecyl-2-pyrrolidinone and the second surfactant is a short-chain alkylbenzenesulfonate, preferably sodium xylene sulfonate. The preferred amount of the second surfactant is from about 1 weight percent to about 55 weight percent of the total amount of surfactants.

An aqueous solution, wherein the first surfactant is N-dodecyl-2-pyrrolidinone and the second surfactant is hexyl diphenyl ether disulfonate. The preferred amount of the second surfactant is from about 1 weight percent to about 35 weight percent of the total amount of surfactants.

An aqueous solution, wherein the first surfactant is N-dodecyl-2-pyrrolidinone and the second surfactant is a dialkylsulfosuccinate, preferably sodium di(cyclohexyl) sulfosuccinate. The preferred amount of the second surfactant is from about 1 weight percent to about 70 weight percent of the total amount of surfactants.

An aqueous solution, wherein the first surfactant is N-dodecyl-2-pyrrolidinone and the second surfactant is a short-chain, alkoxybenzenesulfonate, preferably $H_9C_4OPhSO_3Na$. The preferred amount of the second surfactant is from about 1 weight percent to about 70 weight percent of the total amount of surfactants.

An aqueous solution, wherein the first surfactant is an ethenoxylated nonylphenol, preferably

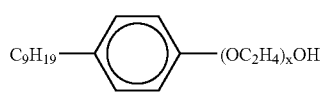

wherein x is an average of 4 and the second surfactant is N-cyclohexyl-2-pyrrolidinone and is N-cyclohexyl-2-pyrrolidinone. The preferred amount of the second surfactant is from about 1 weight percent to about 85 weight percent of the total amount of surfactants.

An aqueous solution, wherein the first surfactant is

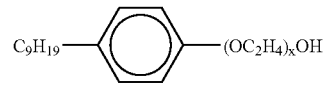

wherein x is an average of 4 and the second surfactant is N-butyl-2-pyrrolidinone. The preferred amount of the second surfactant is from about 1 weight percent to about 65 weight percent of the total amount of surfactants.

An aqueous solution, wherein the first surfactant is

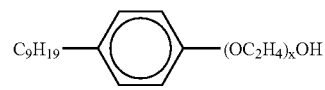

wherein x is an average of 4 and the second surfactant is N-hexyl-2-pyrrolidinone. The preferred amount of the second surfactant is from about 1 weight percent to about 65 weight percent of the total amount of surfactants.

An aqueous solution, wherein the first surfactant is

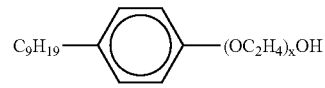

wherein x is an average of 4 and the second surfactant is N-(2'-ethylhexyl)-2-pyrrolidinone. The preferred amount of the second surfactant is from about 1 weight percent to about 95 weight percent of the total amount of surfactants.

An aqueous solution, wherein the first surfactant is

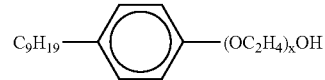

wherein x is an average of 4 and the second surfactant is N-octyl-2-pyrrolidinone. The preferred amount of the second surfactant is from about 1 weight percent to about 95 weight percent of the total amount of surfactants.

An aqueous solution, wherein the first surfactant is

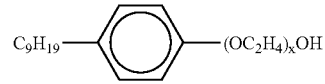

wherein x is an average of 4 and the second surfactant is N-decyl-2-pyrrolidinone. The preferred amount of the second surfactant is from about 35 weight percent to about 99 weight percent of the total amount of surfactants.

An aqueous solution, wherein the first surfactant is an ethenoxylated t-octylphenol, preferably

wherein x is an average of 7 and the second surfactant is N-hexyl-2-pyrrolidinone. and the second surfactant is N-hexyl-2-pyrrolidinone. The preferred amount of the second surfactant is from about 1 weight percent to about 75 weight percent of the total amount of surfactants.

An aqueous solution, wherein the first surfactant is an ethenoxylated t-octylphenol, preferably

wherein x is an average of 7 and the second surfactant is N-octyl-2-pyrrolidinone and the second surfactant is N-octyl-2-pyrrolidinone. The preferred amount of the second surfactant is from about 1 weight percent to about 95 weight percent of the total amount of surfactants.

An aqueous solution, wherein the first surfactant is an ethenoxylated alcohol, preferably $C_nH_m(OC_2H_4)_xOH$, wherein n is 12 or 13, m is 25, 26 or 27 and x is an average of 4, and the second surfactant is N-cyclohexyl-2-pyrrolidinone. The preferred amount of the second surfactant is from about 1 weight percent to about 40 weight percent of the total amount of surfactants.

An aqueous solution, wherein the first surfactant is an ethenoxylated alcohol, preferably $C_nH_m(OC_2H_4)_xOH$, wherein n is 12 or 13, m is 25, 26 or 27 and x is an average of 4, and the second surfactant is N-(2'-ethylhexyl)-2-pyrrolidinone. The preferred amount of the second surfactant is from about 1 weight percent to about 40 weight percent of the total amount of surfactants.

An aqueous solution, wherein the first surfactant is N-decyl-2-pyrrolidinone and the second surfactant is dimethyloctynediol. The preferred amount of the second surfactant is from about 1 weight percent to about 55 weight percent of the total amount of surfactants.

An aqueous solution, wherein the first surfactant is an ethenoxylated nonylphenol, preferably

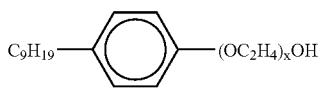

wherein x is an average of 10 and the second surfactant is N-octyl-2-pyrrolidinone. The preferred amount of the second surfactant is from about 60 weight percent to about 99 weight percent of the total amount of surfactants.

An aqueous solution, wherein the first surfactant is an ethenoxylated alcohol, preferably $C_nH_m(OC_2H_4)_xOH$, wherein n is an average of 11, m is an average of 23 and x is an average of 3, and the second surfactant is N-octyl-2-pyrrolidinone. The preferred amount of the second surfactant is from about 1 weight percent to about 35 weight percent of the total amount of surfactants.

An aqueous solution, wherein the first surfactant is $C_nH_m(OC_2H_4)_xOH$, wherein n is 12 or 13, m is 25 or 27 and x is an average of 4, and the second surfactant is N-octyl-2-pyrrolidinone. The preferred amount of the second surfactant is from about 1 weight percent to about 55 weight percent of the total amount of surfactants.

An aqueous solution, wherein the first surfactant is N-dodecyl-2-pyrrolidinone and the second surfactant is a short-chain alkylbenzenesulfonic acid, preferably 4-$H_5C_2PhSO_3H$. The preferred amount of the second surfactant is from about 1 weight percent to about 55 weight percent of the total amount of surfactants.

An aqueous solution, wherein the first surfactant is N-dodecyl-2-pyrrolidinone and the second surfactant is $H_{17}C_8N(CH_3)_3Br$. The preferred amount of the second surfactant is from about 1 weight percent to about 30 weight percent of the total amount of surfactants.

An aqueous solution, wherein the first surfactant is $C_nH_m(OC_2H_4)_xOH$, wherein n is 12 or 13, m is 25, 26 or 27 and x is an average of 5, and the second surfactant is N-dodecyl-2-pyrrolidinone. The preferred amount of the second surfactant is from about 1 weight percent to about 65 weight percent of the total amount of surfactants.

An aqueous solution, wherein the first surfactant is $C_nH_m(OC_2H_4)_xOH$, wherein n is 12-15, m is 25-31 and x is an average of 3, and the second surfactant is N-dodecyl-2-pyrrolidinone. The preferred amount of the second surfactant is from about 1 weight percent to about 60 weight percent of the total amount of surfactants.

An aqueous solution, wherein the first surfactant is

wherein x is an average of 5 and the second surfactant is N-dodecyl-2-pyrrolidinone. The preferred amount of the second surfactant is from about 1 weight percent to about 55 weight percent of the total amount of surfactants.

An aqueous solution, wherein the first surfactant is

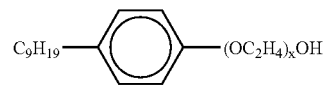

wherein x is an average of 4 and the second surfactant is N-dodecyl-2-pyrrolidinone. The preferred amount of the second surfactant is from about 1 weight percent to about 80 weight percent of the total amount of surfactants.

An aqueous solution, wherein the first surfactant is

wherein x is an average of 5 and the second surfactant is N-octyl-2-pyrrolidinone. The preferred amount of the second surfactant is from about 1 weight percent to about 55 weight percent of the total amount of surfactants.

An aqueous solution, wherein the first surfactant is

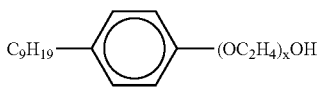

wherein x is an average of 4 and the second surfactant is N-octyl-2-pyrrolidinone. The preferred amount of the second surfactant is from about 1 weight percent to about 75 weight percent of the total amount of surfactants.

An aqueous solution, wherein the first surfactant is

wherein x is an average of 7 and the second surfactant is N-octyl-2-pyrrolidinone. The preferred amount of the second surfactant is from about 1 weight percent to about 90 weight percent of the total amount of surfactants.

An aqueous solution, wherein the first surfactant is

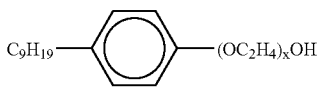

wherein x is an average of 9 and the second surfactant is N-octyl-2-pyrrolidinone. The preferred amount of the second surfactant is from about 10 weight percent to about 99 weight percent of the total amount of surfactants.

An aqueous solution, wherein the first surfactant is

wherein x is an average of 9 and the second surfactant is N-octyl-2-pyrrolidinone. The preferred amount of the second surfactant is from about 5 weight percent to about 99 weight percent of the total amount of surfactants.

An aqueous solution, wherein the first surfactant is

wherein x is an average of 5 and the second surfactant is $C_nH_m(OC_2H_4)_xOH$, where n is 12-14, m is 25-29, x is an average of 3. The preferred amount of the second surfactant is from about 20 weight percent to about 99 weight percent of the total amount of surfactants.

An aqueous solution, wherein the first surfactant is $C_nH_m(OC_2H_4)_xOH$, wherein n is an average of 11, m is an average of 23 and x is an average of 3, and the second surfactant is $C_nH_m(OC_2H_4)_xOH$, where n is 12-14, m is 25-29, x is an average of 3. The preferred amount of the second surfactant is from about 1 weight percent to about 55 weight percent of the total amount of surfactants.

An aqueous solution, wherein the first surfactant is $C_nH_m(OC_2H_4)_xOH$, wherein n is an average of 11, m is an average of 23 and x is an average of 3, and the second surfactant is $C_nH_m(OC_2H_4)_xOH$, where n is 12-14, m is 25-29, x is an average of 5. The preferred amount of the second surfactant is from about 10 weight percent to about 99 weight percent of the total amount of surfactants.

An aqueous solution, wherein the first surfactant is $C_nH_m(OC_2H_4)_xOH$, where n is 12-14, m is 25-29, x is an average of 5, and the second surfactant is N-octyl-2-pyrrolidinone. The preferred amount of the second surfactant is from about 1 weight percent to about 40 weight percent of the total amount of surfactants.

An aqueous solution, wherein the first surfactant is $C_{12}H_{25}(branched)(OC_2H_4)_nOH$, where x is an average of 3, and the second surfactant is N-octyl-2-pyrrolidinone. The preferred amount of the second surfactant is from about 1 weight percent to about 40 weight percent of the total amount of surfactants.

In a preferred embodiment of the present invention, a two component aqueous solution is provided, wherein a first aqueous solution comprising a first surfactant is applied to a solid hydrophobic surface and then a second aqueous solution comprising a second surfactant contacts the first aqueous solution on the solid hydrophobic surface in an amount sufficient to cause a synergistic increase in the spreading factor on the hydrophobic surface. The preferred combinations of the two aqueous solutions include first and second surfactants in the following amounts.

A two component aqueous solution comprising a first aqueous solution, wherein the first surfactant is sodium decyl sulfonate ($C_{10}H_{21}SO_3^-Na^+$) and a second aqueous solution, wherein the second surfactant is dodecyltrimethylammonium bromide ($C_{12}H_{25}(CH_3)_3N^+Br^-$). The preferred amount of the second surfactant is from about 1 weight percent to about 99 weight percent of the total amount of surfactants.

A two component aqueous solution comprising a first aqueous solution, wherein the first surfactant is sodium decyl sulfonate ($C_{10}H_{21}SO_3^-Na^+$) and a second aqueous solution, wherein the second surfactant is dodecyltrimethylammonium chloride ($C_{12}H_{25}(CH_3)_3N^+Cl^-$). The preferred amount of the second surfactant is from about 1 weight percent to about 99 weight percent of the total amount of surfactants.

A two component aqueous solution comprising a first aqueous solution, wherein the first surfactant is sodium decyl sulfonate ($C_{10}H_{21}SO_3^-Na^+$) and a second aqueous solution, wherein the second surfactant is decyltrimethylammonium bromide ($C_{10}H_{21}(CH_3)_3N^+Br^-$). The preferred amount of the second surfactant is from about 1 weight percent to about 99 weight percent of the total amount of surfactants.

A two component aqueous solution comprising a first aqueous solution, wherein the first surfactant is sodium decyl sulfonate ($C_{10}H_{21}SO_3^-Na^+$) and a second aqueous solution, wherein the second surfactant is decylpyridinium bromide ($C_{10}H_{21}Pyr\ N^+Br^-$). The preferred amount of the second surfactant is from about 1 weight percent to about 99 weight percent of the total amount of surfactants.

A two component aqueous solution comprising a first aqueous solution, wherein the first surfactant is sodium dodecyl sulfate ($C_{12}H_{25}SO_3^-Na^+$) and a second aqueous solution, wherein the second surfactant is dodecyltrimethylammonium bromide ($C_{12}H_{25}(CH_3)_3N^+Br^-$). The preferred amount of the second surfactant is from about 1 weight percent to about 99 weight percent of the total amount of surfactants.

A two component aqueous solution comprising a first aqueous solution, wherein the first surfactant is sodium dodecyl sulfate ($C_{12}H_{25}SO_3^-Na^+$) and a second aqueous solution, wherein the second surfactant is decyltrimethylammonium bromide ($C_{10}H_{21}(CH_3)_3N^+Br^-$). The preferred amount of the second surfactant is from about 1 weight percent to about 99 weight percent of the total amount of surfactants.

EXAMPLES

Example 1

The Spreading Factors (SF) for the aqueous solutions that are shown in FIGS. 1-22 were determined using the following procedure. First, 20 µL of an aqueous solution containing a surfactant blend having a total concentration of 1.0 g/liter was applied to a polyethylene film using a microliter syringe. The area of the solution on the film was measured 3 minutes after its application at ambient conditions. The same procedure was used with deionized water and the area on the film was measured after 3 minutes. The Spreading Factor was then determined by calculating the ratio of the area of the aqueous solution containing the surfactant blend and the area of the deionized water.

Example 2

In this example, four aqueous solutions were formed by combining different amounts of the surfactant Neodol 1-3 ($C_{11}H_{23}(OC_2H_4)_3OH$) and the surfactant N-decyl-2-pyrrolidinone. The total concentration of surfactants was 1.0 g/liter. The mixtures contained 20, 40, 60 and 80% by weight of Neodol 1-3 and 80, 60, 40 and 20% by weight of N-decyl-2-pyrrolidinone, respectively. After the mixtures were formed their Spreading Factors were determined according to the method described in Example 1. The Spreading Factors for 100% Neodol 1-3 and 100% N-decyl-2-pyrrolidinone were also determined using the same method. The Spreading Factors were then plotted on the graph shown in FIG. 12. The graph shows that the addition of between 1 to 50% by weight of N-decyl-2-pyrrolidinone to the Neodol 1-3 provides Spreading Factors that are higher than the Spreading Factors for 100% Neodol 1-3 and 100% N-decyl-2-pyrrolidinone.

Example 3

The method of Example 2 was used with different combinations of surfactants. The results are shown in FIGS. 1-22.

Example 4

Figure 23:
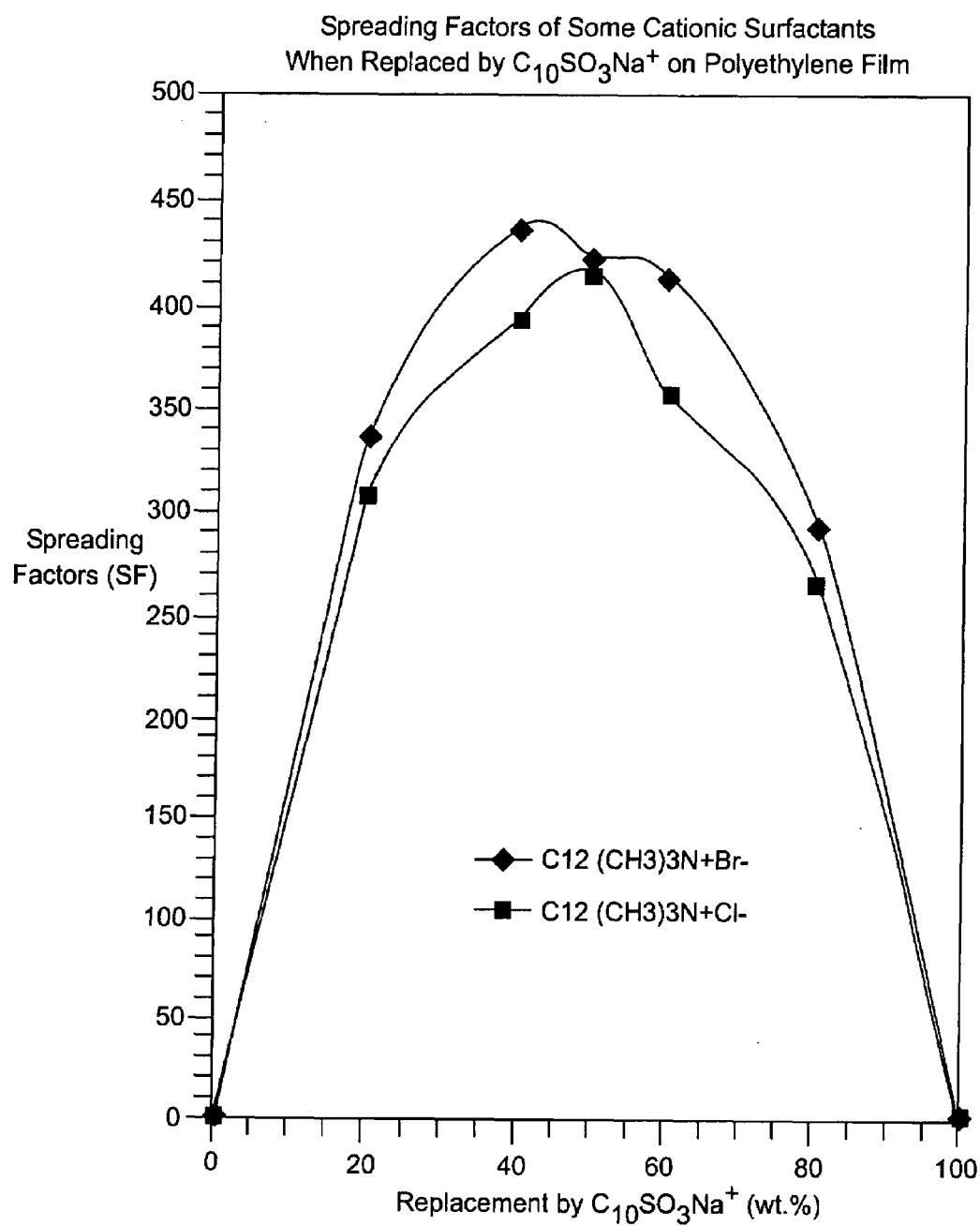
Figure 24:
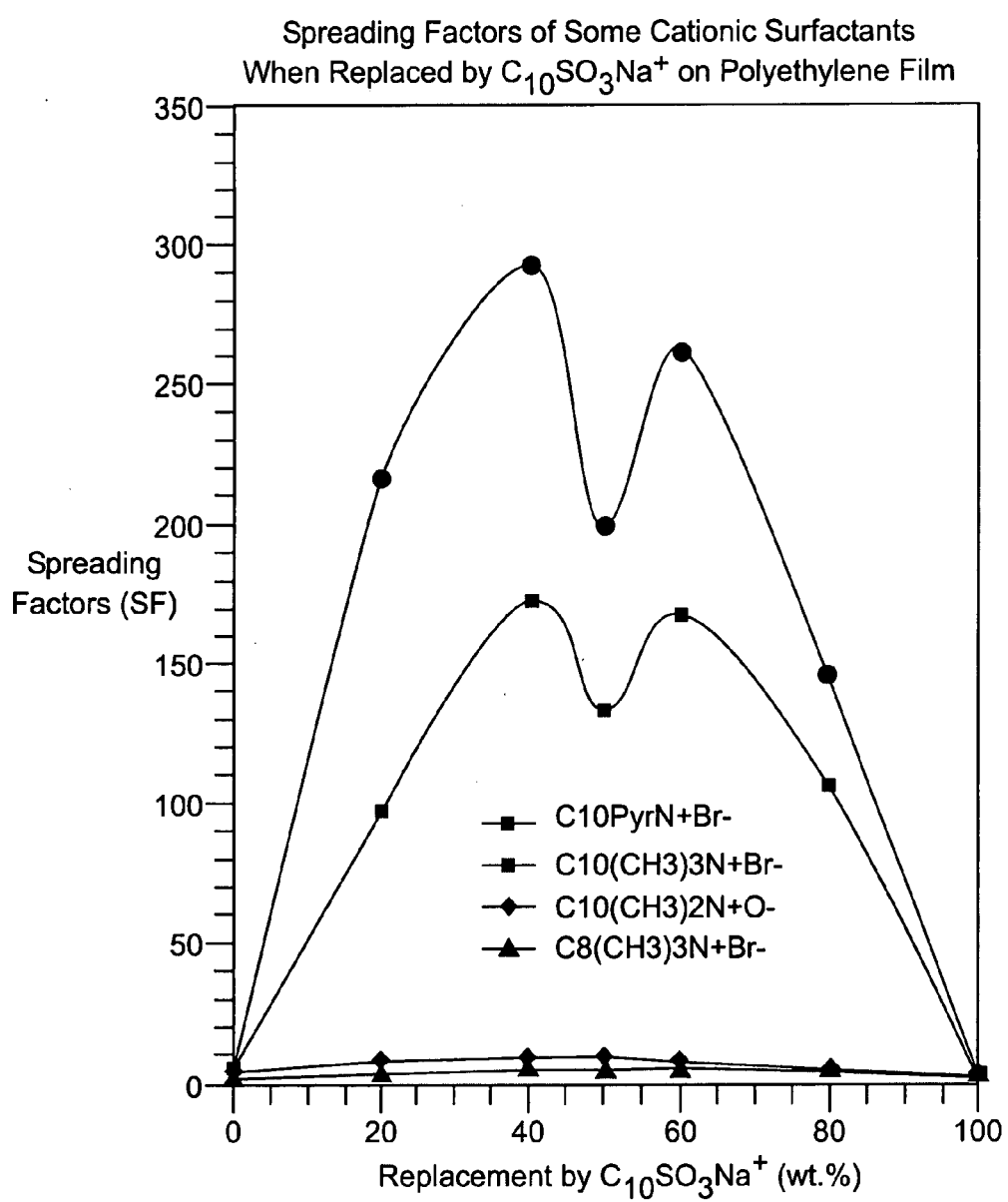
Figure 25:
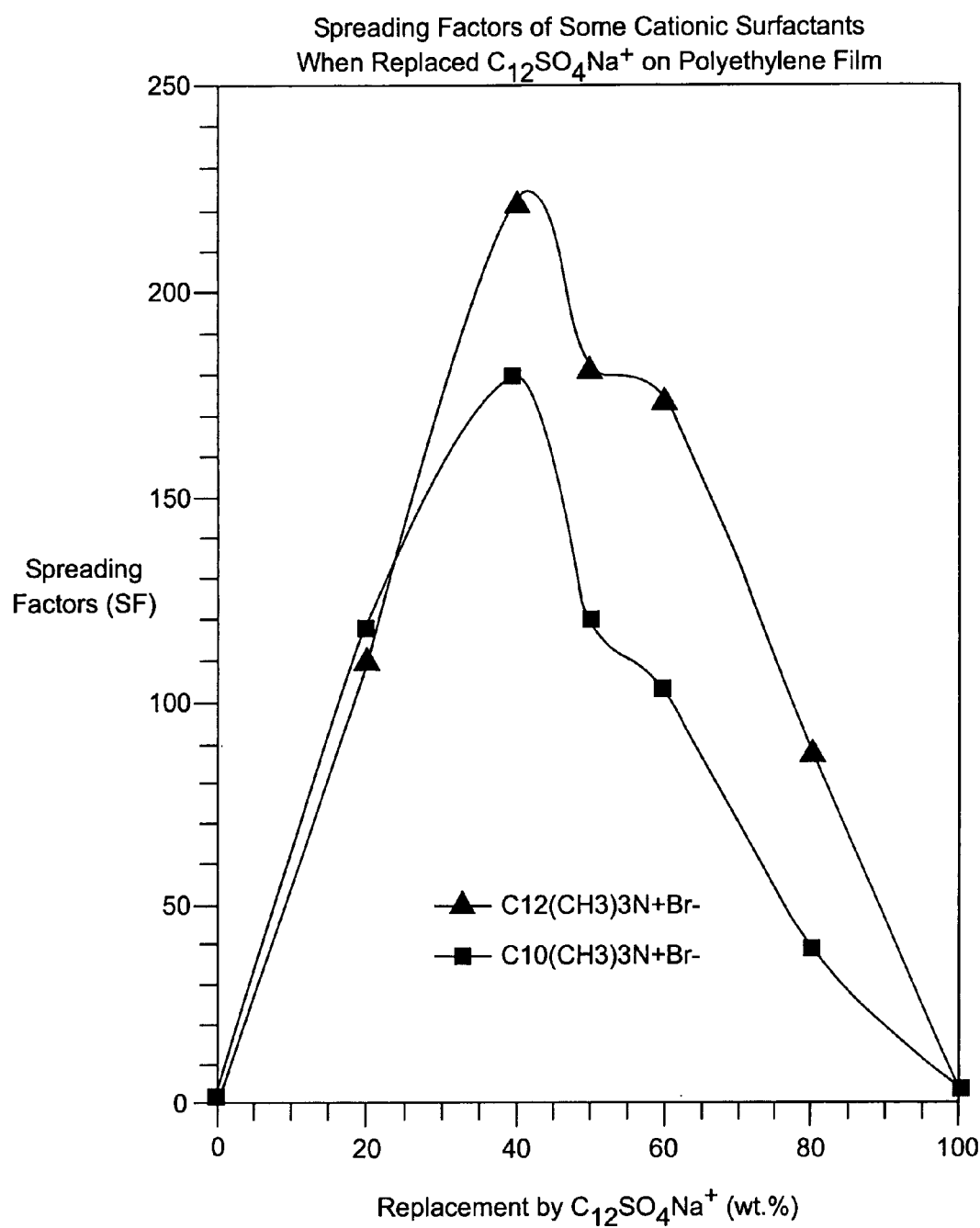

The Spreading Factors (SF) for the aqueous solutions that are shown in FIGS. 23-25 were determined using the following procedure. A drop of a first aqueous solution containing a first surfactant at a surfactant concentration of 1.0 g/liter was applied to a polyethylene film using a microliter syringe. A drop of a second aqueous solution containing a second surfactant at a surfactant concentration of 1.0 g/liter was immediately applied onto the first drop using a microliter syringe. The total volume of the two drops was 20 µL. The volume of each of the two drops was varied so that the weight percentage of the two surfactants to each other could be changed, while maintaining the total volume at 20 µL and the total surfactant concentration at 1.0 g/liter. The area of the solution on the film was measured at ambient conditions 3 minutes after the applications. A 20 µL drop of deionized water was applied to the polyethylene film and its area on the film was measured after 3 minutes. The spreading factor was then determined by calculating the ration of the area of the aqueous solution containing the surfactant blend to the area of the deionized water.

Example 5

In this example, a first aqueous solution containing the surfactant $C_{10}H_{21}SO_3^-Na^+$ was formed and a second aqueous solution containing the surfactant $C_{12}H_{25}(CH_3)_3N^+Br^-$ was formed. The total concentration of the surfactant in each solution was 1.0 g/liter. The two aqueous solutions were then applied sequentially to a polyethylene film so that the total volume applied was 20 µL. The volume of each of the two solutions was varied to vary the weight percentages of the surfactants to each other. In this manner, five samples were tested. The samples contained 20, 40, 50, 60 and 80% by weight of $C_{10}H_{21}SO_3^-Na^+$ and 80, 60, 50, 40 and 20% by weight of $C_{12}H_{25}(CH_3)_3N^+Br^-$, respectively. After the two solutions were sequentially applied, their Spreading Factors were determined according to the method described in Example 4. The Spreading Factors for 100% $C_{10}H_{21}SO_3^-Na^+$ and 100% $C_{12}H_{25}(CH_3)_3N^+Br^-$ were also determined using the same method. The Spreading Factors were then plotted on the graph shown in FIG. 23. The graph shows the synergistic effect of the two surfactants. Any combination of the two surfactants provides a Spreading Factor that is higher than the Spreading Factor for 100% $C_{10}H_{21}SO_3^-Na^+$ and 100% $C_{12}H_{25}(CH_3)_3N^+Br^-$.

Example 6

Figure 26:
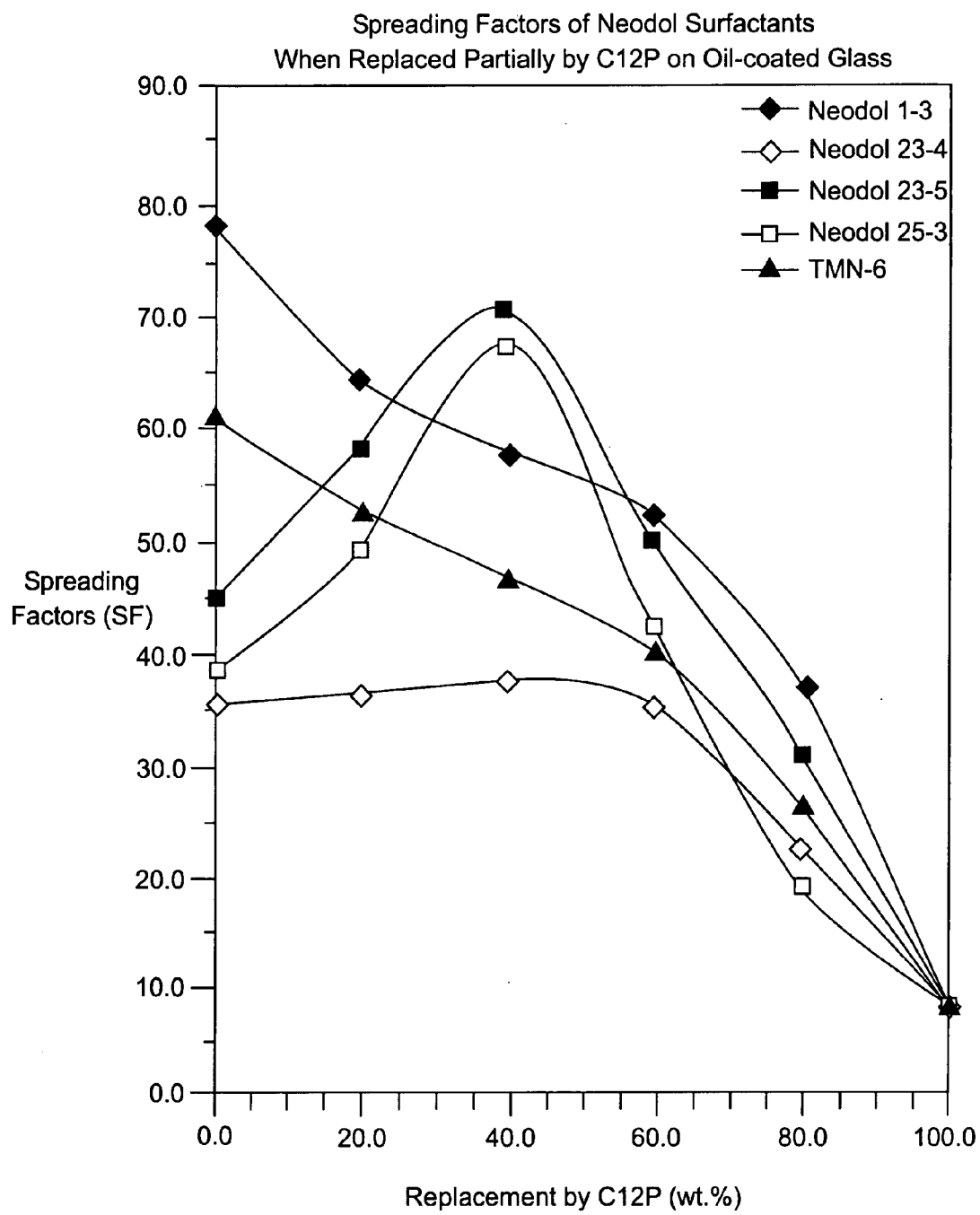
Figure 27:
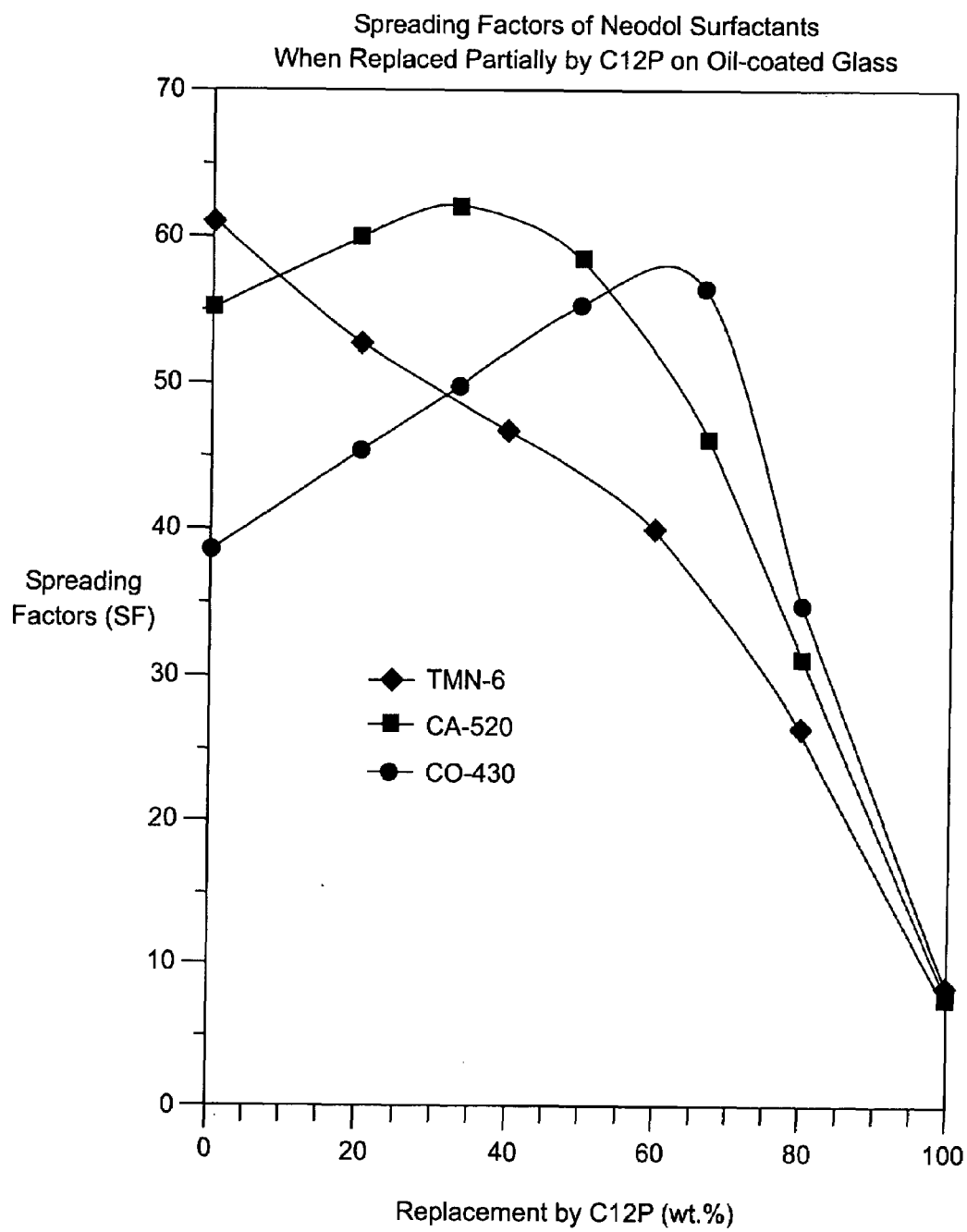
Figure 28:
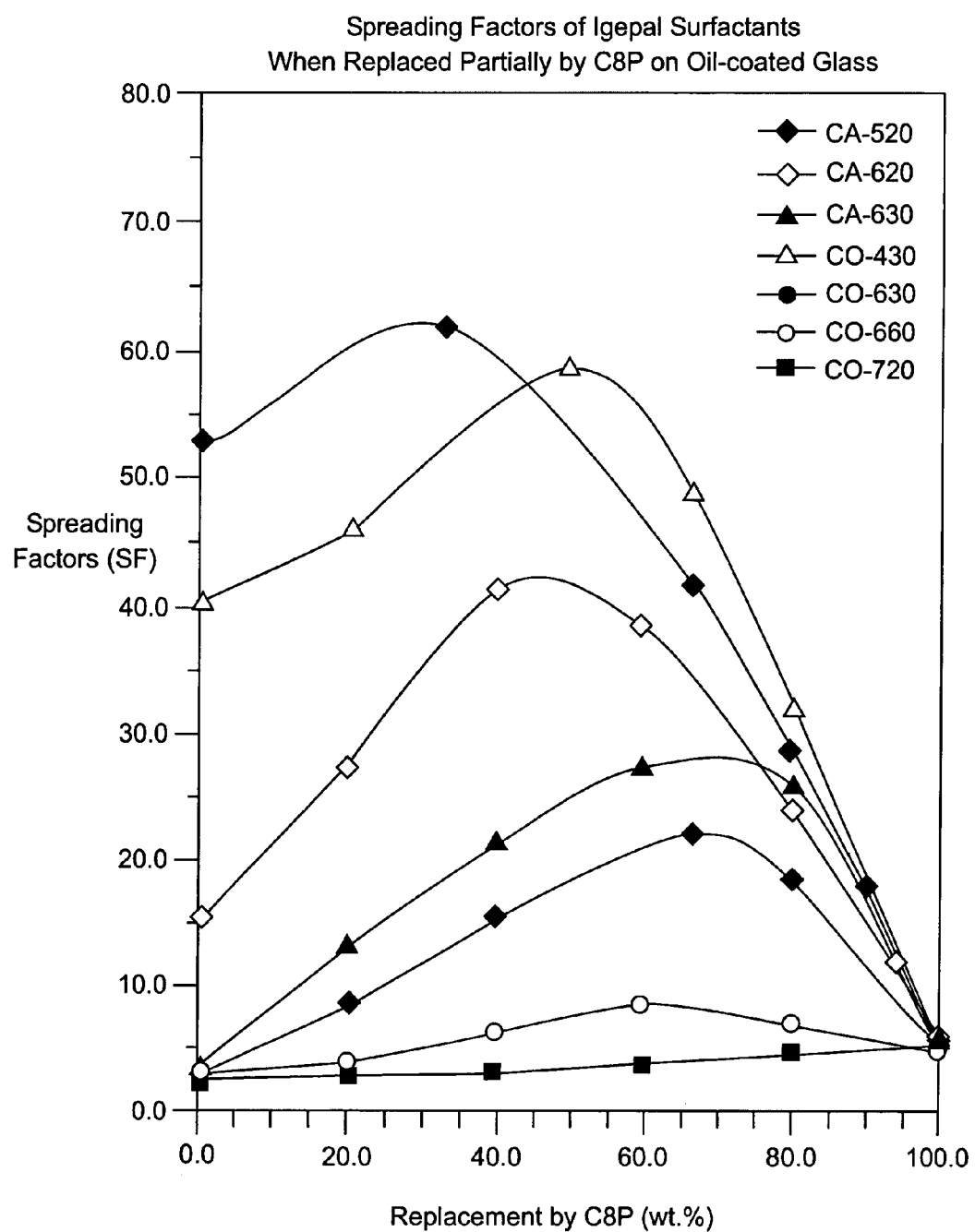

The Spreading Factors (SF) for the aqueous solutions that are shown in FIGS. 26-28 were determined using the following procedure. First, 10 µL of an aqueous solution containing a surfactant blend having a total concentration of 1.0 g/liter was applied to an oil-covered glass using a microliter syringe. The area of the solution on the glass was measured 3 minutes after its application at ambient conditions. The same procedure was used with deionized water and the area on the glass was measured after 3 minutes. The Spreading Factor was then determined by calculating the ratio of the area of the aqueous solution containing the surfactant blend and the area of the deionized water.

Example 7

In this example, four aqueous solutions were formed by combining different amounts of the surfactant Neodol 1-3 ($C_{11}H_{23}(OC_2H_4)_3OH$) and the surfactant N-dodecyl-pyrrolidinone. The total concentration of surfactants was 1.0 g/liter. The mixtures contained 20, 40, 60 and 80% by weight of Neodol 1-3 and 80, 60, 40 and 20% by weight of N-dodecyl-pyrrolidinone, respectively. After the mixtures were formed their Spreading Factors were determined according to the method described in Example 6. The Spreading Factors for 100% Neodol 1-3 and 100% N-dodecyl-pyrrolidinone were also determined using the same method. The Spreading Factors were then plotted on the graph shown in FIG. 26. The graph shows that the addition of between 1 to 65% by weight of N-dodecyl-pyrrolidinone to the Neodol 1-3 provides Spreading Factors that are higher than the Spreading Factors for 100% Neodol 1-3 and 100% N-decyl-2-pyrrolidinone.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A solid hydrophobic surface wetted with an aqueous solution comprising a combination of an ethenoxylated alcohol surfactant and an N-alkyl-2-pyrrolidinone surfactant, wherein:
   the N-alkyl-2-pyrrolidinone surfactant contains an N-alkyl group having a minimum of eight carbon atoms;
   the ethenoxylated alcohol surfactant contains a hydrocarbon chain having a minimum of six carbon atoms;
   the minimum total amount of the ethenoxylated alcohol surfactant and the N-alkyl-2-pyrrolidinone surfactant is about 0.01 percent by weight of the aqueous solution and the maximum total amount of the ethenoxylated alcohol surfactant and the N-alkyl-2-pyrrolidinone surfactant is about 1.0 percent by weight of the aqueous solution; and
   the N-alkyl-2-pyrrolidinone surfactant and the ethenoxylated alcohol surfactant are present in the aqueous solution in an amount that causes a synergistic increase in the spreading factor on the solid hydrophobic surface.

2. A solid hydrophobic surface according to claim 1, wherein the surfactants are $C_nH_m(OC_2H_4)_xOH$, wherein n is an average of 11, m is an average of 23 and x is an average of 3 and N-decyl-2-pyrrolidinone, and the N-decyl-2-pyrrolidinone is from about 5 weight percent to about 50 weight percent of the total amount of surfactants.

3. A solid hydrophobic surface according to claim 1, wherein the surfactants are $C_nH_m(OC_2H_4)_xOH$, wherein n is 12 or 13, m is an average of 25 or 27 and x is an average of 4 and N-decyl-2-pyrrolidinone, and the N-decyl-2-pyrrolidinone is from about 35 weight percent to about 70 weight percent of the total amount of surfactants.

4. A solid hydrophobic surface according to claim 1, wherein the surfactants are $C_nH_m(OC_2H_4)_xOH$, wherein n is an average of 11, m is an average of 23 and x is an average of 3 and N-dodecyl-2-pyrrolidinone, and the N-dodecyl-2-pyrrolidinone is from about 5 weight percent to about 30 weight percent of the total amount of surfactants.

5. A solid hydrophobic surface according to claim 1, wherein the surfactants are a branched $C_nH_m$(secondary) $(OC_2H_4)_xOH$, wherein n is 12-14, m is 25-29 and x is an average of 5 and N-octyl-2-pyrrolidinone, and the $C_nH_m$ (secondary) $(OC_2H_4)_nOH$ surfactant is from about 65 weight percent to about 90 weight percent of the total amount of the surfactants.

6. A solid hydrophobic surface according to claim 1, wherein the hydrophobic surface comprises polyethylene or polypropylene.

7. A solid hydrophobic surface according to claim 1, wherein the hydrophobic surface is coated with grease.

8. A solid hydrophobic surface according to claim 1, wherein the hydrophobic surface is coated with wax.

9. A solid hydrophobic surface according to claim 1, wherein the hydrophobic surface is coated with gasoline, motor oil, or a combination thereof.

10. A solid hydrophobic surface according to claim 1, wherein the hydrophobic surface is an oil-coated windshield.

* * * * *

UNITED STATES PATENT AND TRADEMARK OFFICE
CERTIFICATE OF CORRECTION

PATENT NO. : 7,264,885 B2  Page 1 of 1
APPLICATION NO. : 10/385298
DATED : September 4, 2007
INVENTOR(S) : Rosen et al.

It is certified that error appears in the above-identified patent and that said Letters Patent is hereby corrected as shown below:

Column 18, line 17:

Now reads:     "$C_{12}H_{25}(branched)(OC_2H_4)_nOH$,"

Should read:   --$C_{12}H_{25}(branched)(OC_2H_4)_xOH$,--

Column 22, line 18:

Now reads:     "(Secondary $(OC_2H_4)_nOH$"

Should read:   --(Secondary $(OC_2H_4)_xOH$--

Signed and Sealed this

Fifteenth Day of July, 2008

JON W. DUDAS
*Director of the United States Patent and Trademark Office*